US012597278B2

(12) United States Patent (10) Patent No.: US 12,597,278 B2
Yao et al. (45) Date of Patent: Apr. 7, 2026

(54) IMAGE AUTHENTICITY DETECTION METHOD AND DEVICE, COMPUTER DEVICE, AND STORAGE MEDIUM

(71) Applicant: TENCENT TECHNOLOGY (SHENZHEN) COMPANY LIMITED, Shenzhen (CN)

(72) Inventors: Taiping Yao, Shenzhen (CN); Xinyao Wang, Shenzhen (CN); Shouhong Ding, Shenzhen (CN); Jilin Li, Shenzhen (CN); Yunsheng Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 489 days.

(21) Appl. No.: 18/076,021

(22) Filed: Dec. 6, 2022

(65) Prior Publication Data

US 2023/0116801 A1 Apr. 13, 2023

Related U.S. Application Data

(63) Continuation of application No. PCT/CN2021/102723, filed on Jun. 28, 2021.

(30) Foreign Application Priority Data

Aug. 18, 2020 (CN) .......................... 202010829031.3

(51) Int. Cl.
*G06V 20/00* (2022.01)
*G06V 10/26* (2022.01)
(Continued)

(52) U.S. Cl.
CPC .............. *G06V 20/95* (2022.01); *G06V 10/26* (2022.01); *G06V 10/751* (2022.01);
(Continued)

(58) Field of Classification Search
CPC ...... G06V 20/95; G06V 10/26; G06V 10/751; G06V 10/774; G06V 10/82; G06V 20/49;
(Continued)

(56) References Cited

U.S. PATENT DOCUMENTS 10,885,362 B2 1/2021 Lin
2019/0197358 A1 6/2019 Madani et al.
(Continued)

FOREIGN PATENT DOCUMENTS

CN 108334848 A 7/2018
CN 108615073 A 10/2018
(Continued)

OTHER PUBLICATIONS

Islam, A., Long, C., Arslan Basharat, & Hoogs, A. (2020). DOA-GAN: Dual-Order Attentive Generative Adversarial Network for Image Copy-Move Forgery Detection and Localization. https://doi.org/10.1109/cvpr42600.2020.00473 (Year: 2020).*
(Continued)

*Primary Examiner* — Gregory A Morse
*Assistant Examiner* — David Alexander Wambst
(74) *Attorney, Agent, or Firm* — Anova Law Group, PLLC

(57) ABSTRACT

An image authenticity detection method includes: obtaining a target image; inputting the target image into a generator of a generative adversarial network, and outputting an artifact image corresponding to the target image through the generator, where the artifact image is used for representing a difference between the target image and a real image; the generator is configured to output a prediction artifact image corresponding to a sample image and generate a fitting image based on the prediction artifact image; and the generative adversarial network further comprises a discriminator in a training stage, and the discriminator is configured
(Continued)

A: Real sample image
B: False sample image
Artifact A: Prediction artifact image of the real sample image
Artifact B: Prediction artifact image of the false sample image
Live A: Fitting image of the real sample image
Live B: Fitting image of the false sample image to discriminate the authenticity of the fitting image, to assist the generator to learn a difference feature between a false image and a real image; and determining an authenticity detection result of the target image based on the artifact image.

20 Claims, 9 Drawing Sheets

(51) Int. Cl.

| | |
|---|---|
| *G06V 10/75* | (2022.01) |
| *G06V 10/774* | (2022.01) |
| *G06V 10/82* | (2022.01) |
| *G06V 20/40* | (2022.01) |
| *G06V 40/16* | (2022.01) |

(52) U.S. Cl.
CPC ............ *G06V 10/774* (2022.01); *G06V 10/82* (2022.01); *G06V 20/49* (2022.01); *G06V 40/161* (2022.01)

(58) Field of Classification Search
CPC .... G06V 40/161; G06V 40/172; G06V 40/16; G06V 40/40; G06V 40/168; G06N 3/02–105; G06F 18/214; G06F 18/241
See application file for complete search history.

(56) References Cited

U.S. PATENT DOCUMENTS

| | | | |
|---|---|---|---|
| 2019/0236614 A1 | 8/2019 | Burgin et al. | |
| 2020/0160502 A1 | 5/2020 | Niessner et al. | |
| 2022/0114722 A1 | 4/2022 | Meriguet et al. | |
| 2022/0156897 A1* | 5/2022 | Jeong ........................ | G06T 5/77 |

FOREIGN PATENT DOCUMENTS

| | | | |
|---|---|---|---|
| CN | 109086645 A | 12/2018 | |
| CN | 111179219 A | 5/2020 | |
| CN | 111429355 A | 7/2020 | |
| CN | 111539483 A | 8/2020 | |
| CN | 111709408 A | 9/2020 | |
| WO | 2020148536 A1 | 7/2020 | |

OTHER PUBLICATIONS

Sabir, E., Cheng, J., Jaiswal, A., AbdAlmageed, W., Masi, I., & Natarajan, P. (2019). Recurrent Convolutional Strategies for Face Manipulation Detection in Videos. ArXiv:1905.00582 [Cs]. https://arxiv.org/abs/1905.00582 (Year: 2019).*

Jain, A., Singh, R., & Vatsa, M. (Oct. 1, 2018). On Detecting GANs and Retouching based Synthetic Alterations. IEEE Xplore. https://doi.org/10.1109/BTAS.2018.8698545 (Year: 2018).*

Galamo Monkam, & Yan, J. (2023). Digital Image Forensic Analyzer to Detect AI-generated Fake Images. https://doi.org/10.1109/cacre58689.2023.10208613 (Year: 2023).*

Singh, D., & Anil Ahlawat. (2022). Generative Adversarial Networks, Their Various Types, A Comparative Analysis, and Applications in Different Areas. 1-5. https://doi.org/10.1109/icict55121.2022.10064488 (Year: 2022).*

Abdalla, Y., Iqbal, M. T., & Shehata, M. (2019). Copy-Move Forgery Detection and Localization Using a Generative Adversarial Network and Convolutional Neural-Network. Information, 10(9), 286. https://doi.org/10.3390/info10090286 (Year: 2019).*

Schlegl, T., Seeböck, P., Waldstein, S. M., Schmidt-Erfurth, U., & Langs, G. (2017). Unsupervised Anomaly Detection with Generative Adversarial Networks to Guide Marker Discovery. ArXiv:1703.05921 [Cs]. https://arxiv.org/abs/1703.05921 (Year: 2017).*

Schlegl, T., Seeböck, P., Waldstein, S. M., Langs, G., & Schmidt-Erfurth, U. (2019). f-AnoGAN: Fast unsupervised anomaly detection with generative adversarial networks. Medical Image Analysis, 54, 30-44. https://doi.org/10.1016/j.media.2019.01.010 (Year: 2019).*

Zhang, L., Long, C., Zhang, X., & Xiao, C. (2019). RIS-GAN: Explore Residual and Illumination with Generative Adversarial Networks for Shadow Removal. ArXiv.org. https://arxiv.org/abs/1911.09178 (Year: 2019).*

Shi, Z., Chen, H., Chen, L., & Zhang, D. (2023). Discrepancy-Guided Reconstruction Learning for Image Forgery Detection. ArXiv.org. https://arxiv.org/abs/2304.13349 (Year: 2023).*

Li, O., Cai, J., Hao, Y., Jiang, X., Hu, Y., & Feng, F. (2024). Improving Synthetic Image Detection Towards Generalization: An Image Transformation Perspective. ArXiv.org. https://arxiv.org/abs/2408.06741 (Year: 2024).*

China National Intellectual Property Administration (CNIPA) Office Action 1 for 202010829031.3, Oct. 10, 2020 11 Pages (including translation).

The World Intellectual Property Organization (WIPO) International Search Report for PCT/CN2021/102723 Sep. 29, 2021 8 Pages (including translation).

The European Patent Office (EPO) The Extended European Search Report for 21857354.1 Aug. 4, 2023 14 Pages (including translation).

Ashraful Islam, et al., "DOA-GAN: Dual-Order Attentive Generative Adversarial Network for Image Copy-move Forgery Detection and Localization", 2020 IEEE/CVF Conference on Computer Vision and Pattern Recognition (CVPR), Jun. 13, 2020 10 Pages.

Sri Kalyan, et al., "Satellite Image Forgery Detection and Localization Using GAN and One-Class Classifier", Feb. 13, 2018 9 Pages.

Gong, et al., "Generative Adversarial Networks for Change Detection in Multispectral Imagery", IEEE Geoscience and Remote Sensing Letters, vol. 14, No. 12, Dec. 2017 5 Pages.

* cited by examiner

False region label of false sample image          False region label of real sample image A: Real sample image B: False sample image Artifact A: Prediction artifact image of the real sample image Artifact B: Prediction artifact image of the false sample image Live A: Fitting image of the real sample image Live B: Fitting image of the false sample image

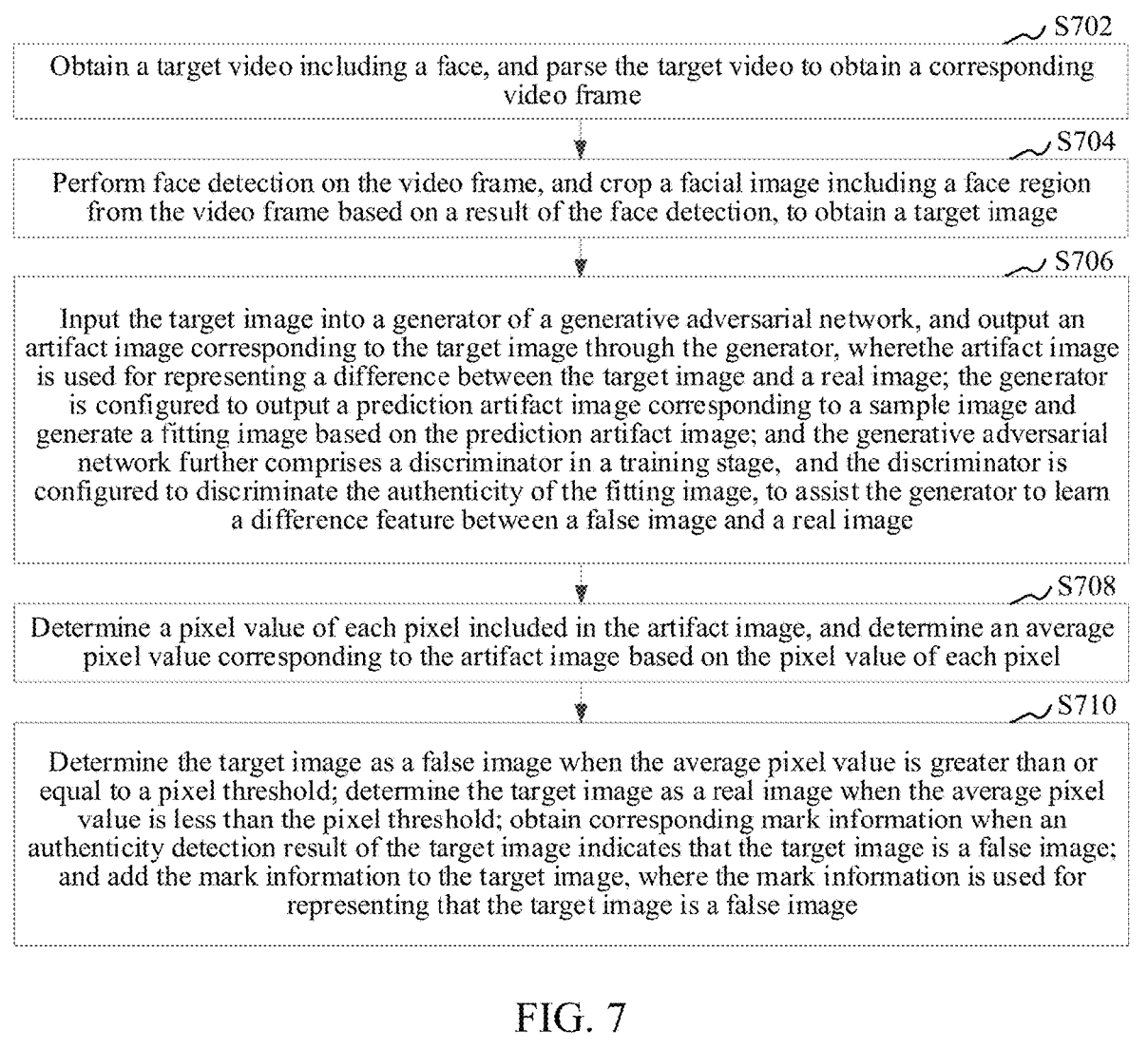

~ S702

Obtain a target video including a face, and parse the target video to obtain a corresponding video frame

~ S704

Perform face detection on the video frame, and crop a facial image including a face region from the video frame based on a result of the face detection, to obtain a target image

~ S706

Input the target image into a generator of a generative adversarial network, and output an artifact image corresponding to the target image through the generator, wherethe artifact image is used for representing a difference between the target image and a real image; the generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false image and a real image

~ S708

Determine a pixel value of each pixel included in the artifact image, and determine an average pixel value corresponding to the artifact image based on the pixel value of each pixel

~ S710

Determine the target image as a false image when the average pixel value is greater than or equal to a pixel threshold; determine the target image as a real image when the average pixel value is less than the pixel threshold; obtain corresponding mark information when an authenticity detection result of the target image indicates that the target image is a false image; and add the mark information to the target image, where the mark information is used for representing that the target image is a false image

FIG. 7

S802

Obtain sample images and image labels corresponding to the sample images, where the image label includes a false region label and an image authenticity label

S804

Input each sample image into a generator of the generative adversarial network, and output a prediction artifact image respectively corresponding to each sample image through the generator

S806

Perform pixel matching on the sample image and the corresponding prediction artifact image, and determine a first pixel and a second pixel corresponding to a same pixel position in the sample image and the prediction artifact image

S808

Subtract a pixel value of the second pixel at the same pixel position from a pixel value of the first pixel, to obtain a fitting pixel value corresponding to the corresponding pixel position; and determine the fitting image of the sample image based on fitting pixel values corresponding to respective pixel positions

S810

Input each sample image into the false region discriminator respectively, and output a first false region prediction result corresponding to the sample image through the false region discriminator; and determine a first false region loss based on the first false region prediction result corresponding to each sample image and the false region label

S812

The sample image includes a real sample image, input the real sample image and the fitting image into the visual reality discriminator as input images respectively, and output first visual reality prediction results corresponding to the input images; and determine a first visual reality loss based on the first visual reality prediction results corresponding to the input images and the image authenticity label

S814

Construct a discriminator loss function according to the first false region loss and the first visual reality loss; and perform training on the false region discriminator and the visual reality discriminator through the discriminator loss function, and stop until the first training stop condition is reached, to obtain a pre-trained false region discriminator and a pre-trained visual reality discriminator

S816

Input the fitting image into a false region discriminator obtained through the first training, and output a second false region prediction result corresponding to the fitting image; and input the fitting image into a visual reality discriminator obtained through the first training, and output a second visual reality prediction result corresponding to the fitting image

S818

Determine a second false region loss based on the second false region prediction result corresponding to the fitting image and a false region label corresponding to a real sample image; and determine a second visual reality loss based on the second visual reality prediction result corresponding to the fitting image and an image authenticity label corresponding to the real sample image

S820

Determine a prediction artifact image corresponding to the real sample image; and determine an artifact loss based on a difference between the prediction artifact image corresponding to the real sample image and the false region label corresponding to the real sample image

S822

Construct a generator loss function according to the artifact loss, the second false region loss, and the second visual reality loss; and perform training on the generator in the generative adversarial network through the generator loss function, and stop until the second training stop condition is reached

S824

Return to the operation of performing first training on a discriminator in the generative adversarial network based on the sample image, the image label, and the fitting image, and stop training until the iteration stop condition is reached, to obtain a trained generative adversarial network

S826

Obtain a target image

S828

Input the target image into a generator of a generative adversarial network, and output an artifact image corresponding to the target image through the generator

S830

Determine an authenticity detection result of the target image based on artifact information in the artifact image

FIG. 8

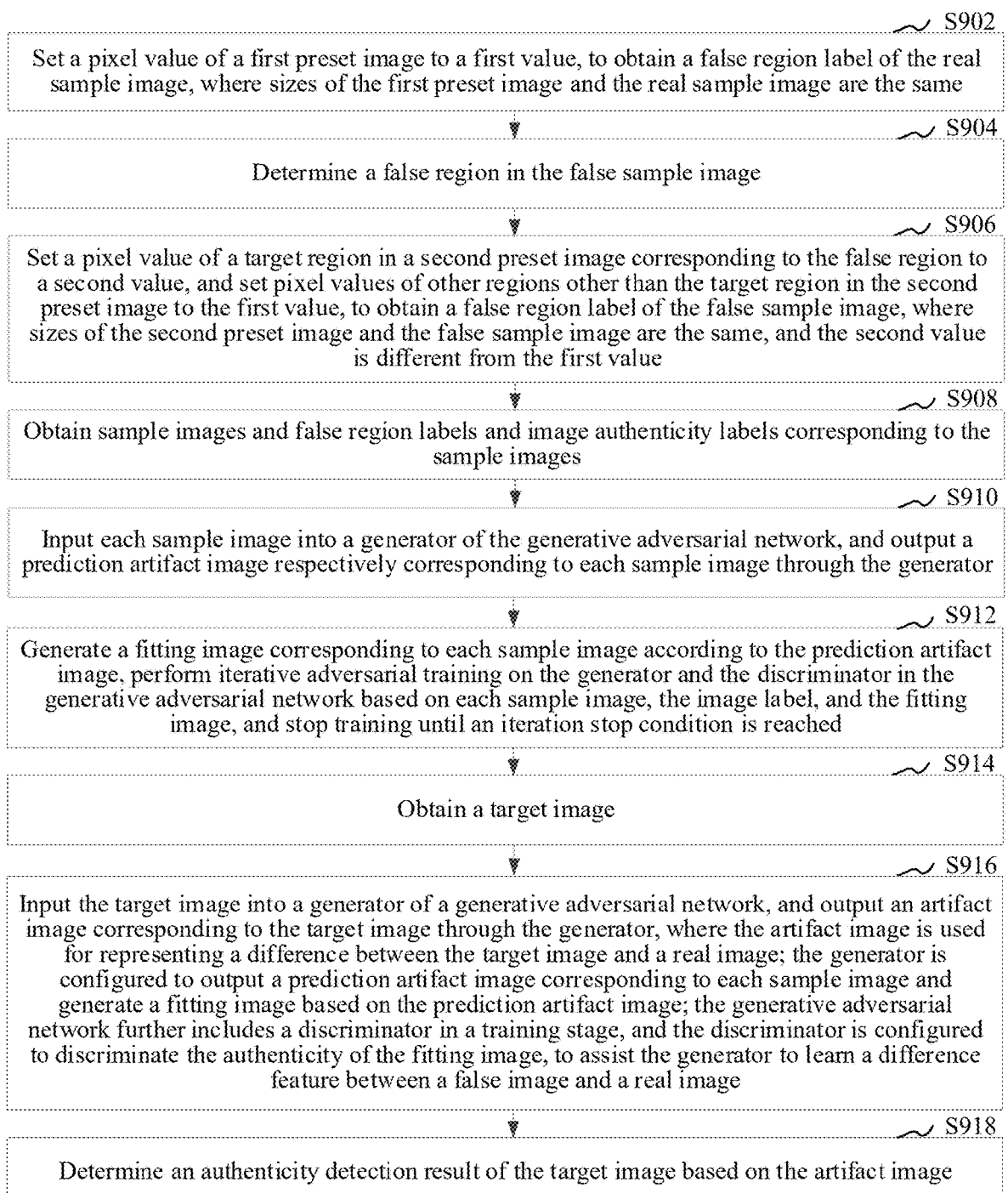

S902

Set a pixel value of a first preset image to a first value, to obtain a false region label of the real sample image, where sizes of the first preset image and the real sample image are the same

S904

Determine a false region in the false sample image

S906

Set a pixel value of a target region in a second preset image corresponding to the false region to a second value, and set pixel values of other regions other than the target region in the second preset image to the first value, to obtain a false region label of the false sample image, where sizes of the second preset image and the false sample image are the same, and the second value is different from the first value

S908

Obtain sample images and false region labels and image authenticity labels corresponding to the sample images

S910

Input each sample image into a generator of the generative adversarial network, and output a prediction artifact image respectively corresponding to each sample image through the generator

S912

Generate a fitting image corresponding to each sample image according to the prediction artifact image, perform iterative adversarial training on the generator and the discriminator in the generative adversarial network based on each sample image, the image label, and the fitting image, and stop training until an iteration stop condition is reached

S914

Obtain a target image

S916

Input the target image into a generator of a generative adversarial network, and output an artifact image corresponding to the target image through the generator, where the artifact image is used for representing a difference between the target image and a real image; the generator is configured to output a prediction artifact image corresponding to each sample image and generate a fitting image based on the prediction artifact image; the generative adversarial network further includes a discriminator in a training stage, and the discriminator is configured to discriminate the authenticity of the fitting image, to assist the generator to learn a difference feature between a false image and a real image

S918

Determine an authenticity detection result of the target image based on the artifact image

Obtain sample images and image labels corresponding to the sample images, where the sample image includes a real sample image and a false sample image, and the image label includes a false region label and an image authenticity label

~S1004

Input each real sample image and each false sample image into a to-be-trained generator in a generative adversarial network respectively, output a prediction artifact image respectively corresponding to each real sample image and each false sample image through the to-be-trained generator, and generate a fitting image respectively corresponding to each real sample image and each false sample image according to the prediction artifact image

~S1006

Input each real sample image, each false sample image, and the fitting image into a to-be-trained discriminator in the generative adversarial network respectively, and output a first false region prediction result and a first visual reality prediction result

~S1008

Perform first training on the to-be-trained discriminator based on a first difference between the first false region prediction result and a corresponding false region label and a second difference between the first visual reality prediction result and a corresponding image authenticity label, and stop until a first training stop condition is reached

~S1010

Input the fitting image into a discriminator obtained through the first training, and output a second false region prediction result and a second visual reality prediction result of the fitting image

~S1012

Perform second training on the to-be-trained generator based on a third difference between the second false region prediction result and a false region label corresponding to each real sample image and a fourth difference between the second visual reality prediction result and an image authenticity label corresponding to each real sample image, and stop until a second training stop condition is reached

~S1014

Perform the first training and the second training alternately, and stop training until an iteration stop condition is reached, to obtain a trained generative adversarial network, where a generator in the trained generative adversarial network is configured to perform image authenticity detection on a target image

FIG. 10

IMAGE AUTHENTICITY DETECTION METHOD AND DEVICE, COMPUTER DEVICE, AND STORAGE MEDIUM

CROSS-REFERENCES TO RELATED APPLICATIONS

This application is a continuation application of PCT Patent Application No. PCT/CN2021/102723, entitled "IMAGE AUTHENTICITY DETECTION METHOD AND APPARATUS, COMPUTER DEVICE AND STORAGE MEDIUM" and filed on Jun. 28, 2021, which claims priority to Chinese Patent Application No. 202010829031.3, entitled "IMAGE AUTHENTICITY DETECTION METHOD AND DEVICE" filed with the China National Intellectual Property Administration on Aug. 18, 2020, the entire contents of both of which are incorporated herein by reference.

FIELD OF THE TECHNOLOGY

This application relates to the field of image processing technologies, and in particular, to an image authenticity detection method and device, a computer device, and a storage medium.

BACKGROUND OF THE DISCLOSURE

With the development of image editing technology, people can edit content of images at will, leading to more and more high-quality false images that can be recognized as real images, which seriously affects the security of an existing applied image recognition system. Therefore, in terms of security applications, detecting whether an input image has been edited becomes an increasingly important link in network security.

Some existing methods of authenticating an image mainly include detecting whether a target image is a false image by detecting some specific defects in the image. For example, the authenticity of the image can be determined by detecting the matching degree between global illumination and local illumination in the image. However, with the continuous development of image editing technology, some specific defects no longer exist, leading to low accuracy of image authenticity detection.

SUMMARY

Embodiments of this application provide an image authenticity detection method and device, a computer device, and a storage medium.

An image authenticity detection method is provided, performed by a computer device, the method including: obtaining a target image; inputting the target image into a generator of a generative adversarial network, and outputting an artifact image corresponding to the target image through the generator; and determining an authenticity detection result of the target image based on the artifact image. The artifact image is used for representing a difference between the target image and a real image. The generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false image and a real image.

An image authenticity detection device is provided, including: an image obtaining module, configured to obtain a target image; an artifact image generation module, configured to input the target image into a generator of a generative adversarial network, and output an artifact image corresponding to the target image through the generator; and a determining module, configured to determine an authenticity detection result of the target image based on the artifact image. The artifact image is used for representing a difference between the target image and a real image. The generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false image and a real image.

A computer device is provided, including a memory and one or more processors, the memory storing computer-readable instructions, and the computer-readable instructions, when executed by the one or more processors, causing the one or more processors to perform the following operations: obtaining a target image; inputting the target image into a generator of a generative adversarial network, and outputting an artifact image corresponding to the target image through the generator; and determining an authenticity detection result of the target image based on the artifact image. The artifact image is used for representing a difference between the target image and a real image. The generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false image and a real image.

One or more non-transitory storage media storing computer-readable instructions are provided, the computer-readable instructions, when executed by one or more processors, causing the one or more processors to perform the following operations: obtaining a target image; inputting the target image into a generator of a generative adversarial network, and outputting an artifact image corresponding to the target image through the generator; and determining an authenticity detection result of the target image based on the artifact image. The artifact image is used for representing a difference between the target image and a real image. The generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false image and a real image.

An image authenticity detection method is provided, performed by a computer device, the method including: obtaining sample images and image labels corresponding to the sample images, where the sample image includes a real sample image and a false sample image; and the image label includes a false region label and an image authenticity label; inputting each sample image into a to-be-trained generator in a generative adversarial network respectively, outputting a prediction artifact image respectively corresponding to each sample image through the to-be-trained generator, and generating a fitting image respectively corresponding to each sample image according to the prediction artifact image; inputting each sample image and the fitting image into a to-be-trained discriminator in the generative adversarial network respectively, and outputting a first false region prediction result and a first visual reality prediction result; performing first training on the to-be-trained discriminator based on a first difference between the first false region prediction result and a corresponding false region label and a second difference between the first visual reality prediction result and a corresponding image authenticity label, and stopping until a first training stop condition is reached; inputting the fitting image into a discriminator obtained through the first training, and outputting a second false region prediction result and a second visual reality prediction result of the fitting image; performing second training on the to-be-trained generator based on a third difference between the second false region prediction result and a false region label corresponding to each real sample image and a fourth difference between the second visual reality prediction result and an image authenticity label corresponding to each real sample image, and stopping until a second training stop condition is reached; and performing the first training and the second training alternately, and stopping training until an iteration stop condition is reached, to obtain a trained generative adversarial network, where a generator in the trained generative adversarial network is configured to perform image authenticity detection on a target image.

BRIEF DESCRIPTION OF THE DRAWINGS

FIG. 7 is a schematic flowchart of an image authenticity detection method according to one embodiment.

FIG. 8 is a schematic flowchart of an image authenticity detection method according to another embodiment.

FIG. 9 is a schematic flowchart of an image authenticity detection method according to still another embodiment.

FIG. 10 is a schematic flowchart of an image authenticity detection method according to yet another embodiment.

DESCRIPTION OF EMBODIMENTS

Figure 1:
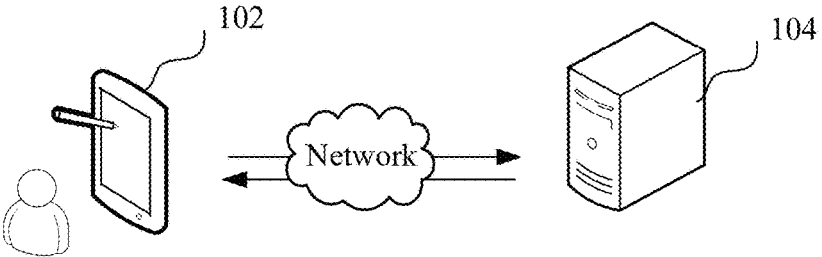
FIG. 1 is a diagram of an application environment of an image authenticity detection method according to an embodiment.

FIG. 1 is a diagram of an application environment of an image authenticity detection method according to an embodiment. Referring to FIG. 1, the image authenticity detection method is applicable to an image authenticity detection system. The image authenticity detection system includes a terminal 102 and a server 104. The terminal 102 and the server 104 are connected through a network. The terminal 102 specifically may be a desktop terminal or a mobile terminal. The mobile terminal specifically may be at least one of a mobile phone, a tablet computer, a notebook computer, or the like. The server 104 may be implemented by an independent server or a server cluster that includes a plurality of servers. Both the terminal 102 and the server 104 may be used independently to perform the image authenticity detection method provided in the embodiments of this application. The terminal 102 and the server 104 may also be used in cooperation to perform the image authenticity detection method provided in the embodiments of this application.

The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner, which is not limited in this application.

This application specifically relates to computer vision (CV) and machine learning (ML) in the field of artificial intelligence. The CV is a science that uses a camera and a computer to replace human eyes to perform machine vision such as detection, recognition, tracking, and measurement on a target, and further perform graphic processing, so that the computer processes the target into an image more suitable for human eyes to observe, or an image transmitted to an instrument for detection.

The "first", "second", and similar terms used in the present disclosure do not indicate any order, quantity, or significance, but are used to only distinguish different components. Unless the context clearly indicates otherwise, the singular form such as "one", "a", "the", and similar terms also do not indicate a quantity limitation, but indicates that there is at least one.

Figure 2:
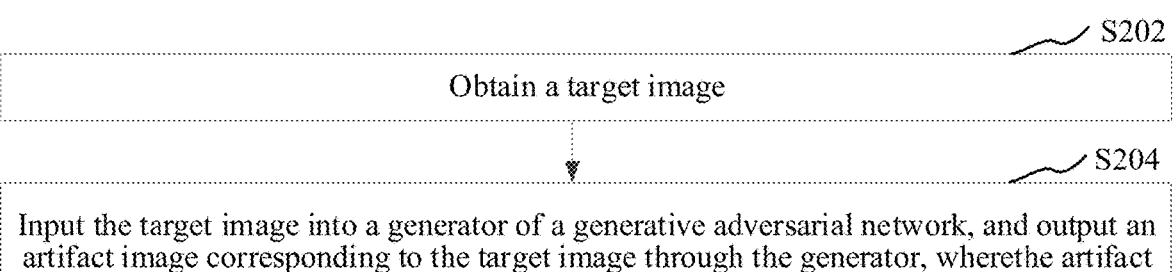
FIG. 2 is a schematic flowchart of an image authenticity detection method according to an embodiment.

In an embodiment, as shown in FIG. 2, an image authenticity detection method is provided. A description is made by using an example in which the method is applicable to a computer device, and the computer device specifically may be the terminal or the server in FIG. 1. The image authenticity detection method includes the following steps:

Step S202: Obtain a target image.

Specifically, when the authenticity of an image needs to be detected, a user may directly upload the target image to the computer device, to cause the computer device to perform authenticity detection on the target image. An authenticity detection result of the target image may include that the target image is a false image and the target image is a real image. When the target image is a false image, it indicates that some or all image content in the target image has been edited; and when the target image is a real image, it indicates that image content in the target image is not edited.

Step S204: Input the target image into a generator of a generative adversarial network, and output an artifact image corresponding to the target image through the generator, where the artifact image is used for representing a difference between the target image and a real image; the generative adversarial network further includes a discriminator in a training stage; in the training stage, the generator is configured to output a prediction artifact image corresponding to a sample image and generate a fitting image based on the prediction artifact image; and the discriminator is configured to discriminate the authenticity of the fitting image, to assist the generator to learn a difference feature between a false image and a real image.

The generative adversarial network is a deep learning model including a generator and a discriminator, which learns from mutual rivalry between the generator and the discriminator in the framework, to obtain a trusted output. A trained generator refers to a model having a capability to extract artifact information in the target image, which specifically may be a model obtained through learning and training using sample images as training data to separate artifact information from the sample images. The discriminator is a model having a capability to discriminate the reliability of a fitting image formed by artifact images outputted by the generator, which specifically may be a model obtained through learning and training using fitting images as training data.

The generator may be configured to, in a using stage, detect the authenticity of an image; and the generator is configured to, in a training stage, learn artifact information in the image and generate a prediction artifact image and a fitting image according to the artifact information obtained through learning. The discriminator may be configured to, in a training stage, discriminate the authenticity of the fitting image outputted by the generator and generated based on the prediction artifact image, to cause the generator to learn a difference feature between a false image and a real image according to the artifact information adjusted and extracted according to an authenticity discrimination result.

The artifact image is image data representing a difference between the target image and a real image, which can perform pixel-level positioning on edited image content in the target image. The artifact information is information included in the artifact image and used for representing the edited image content, which specifically may be pixel values of pixels in the artifact image. The fitting image is a synthesized image, which specifically may be an image close to a real image and synthesized by the target image and the artifact image. In an embodiment, the fitting image may be an image obtained after removing the artifact information of the corresponding artifact image from the target image, namely, data of an image not including any edited image content obtained by performing restoration processing on the target image.

Specifically, in the using stage, the computer device may input the target image into the generator of the generative adversarial network. The generator extracts image features in the target image, determines a false region corresponding to edited image content in the target image based on the image features, and predicts a difference between the edited image content and real image content based on the image features. Further, the generator generates a corresponding artifact image according to the false region and the difference between the edited image content and the real image content obtained through prediction. The image features are data that can reflect image authenticity features. The image features can reflect one or more feature information of color value distribution, illumination value distribution, and an association relationship among pixels of pixels of the target image. The false region refers to an image region corresponding to the edited image content in the image.

For example, the user may perform beautification adjustment on a face in a facial image to obtain an edited image, and the image may be used as the target image. The generator may determine that the edited image content in the target image is a face based on the image features extracted from the target image, and correspondingly, may determine that the false region corresponding to the edited image content is a face region. Further, the generator obtains a preset initial artifact image, predicts a beautification degree of the beautification adjustment performed by the user on the face according to the image features, and adjusts pixel values of pixels in a target region corresponding to the false region in the initial artifact image according to the beautification degree, to obtain the artifact image corresponding to the target image. After the computer device removes the artifact information of the artifact image from the target image, an original facial image on which beautification adjustment is not performed can be obtained, namely, the fitting image corresponding to the target image is obtained. The initial artifact image may be an all-black image having the same size with the target image.

In the training stage, the computer device obtains a sample image and inputs the sample image into a to-be-trained generator. The to-be-trained generator determines a prediction artifact image corresponding to the sample image, and determines a corresponding fitting image according to the sample image and the prediction artifact image. Further, the computer device uses the fitting image as an input of the discriminator. The discriminator discriminates the authenticity of the fitting image generated by the generator and feeds back an authenticity discrimination result to the generator, to cause the generator to correspondingly adjust model parameters according to the received authenticity discrimination result, until the discriminator discriminates the authenticity of the fitting image generated by the generator as real. In this way, the generator learns an essential difference between a false image and a real image with the assistance of the discriminator.

Because the generation quality of the fitting image may be measured based on the discrimination result of the discriminator, real and reliable artifact information can be determined based on the essential difference only when the generator learns the essential difference between a false image and a real image, and the fitting image can be discriminated as a real and reasonable fitting image by the discriminator according to the real and reliable artifact information output. Therefore, in the using stage, the artifact information outputted by the generator can represent the difference between the target image and a real image well.

In an embodiment, the generative adversarial network may be a generative adversarial network (GAN) or may be a generative adversarial network improved on this basis.

In an embodiment, the generator and the discriminator can include various types of machine-learned models. The machine-learned models can include linear models and non-linear models. For example, the machine-learned models can include regression models, support vector machines, decision tree-based models, Bayesian models, and/or neural networks (for example, deep neural networks). For example, the neural networks can include feed-forward neural networks, recurrent neural networks (for example, long short-term memory recurrent neural networks), convolutional neural networks, or neural networks in other forms. The generator and the discriminator are not necessarily limited to being neural networks but can also include machine-learned models in other forms.

In an embodiment, the generator includes an encoding network and a decoding network; and the outputting an artifact image corresponding to the target image through the generator includes: extracting image features in the target image based on the encoding network; and decoding the extracted image features based on the decoding network, to obtain the artifact image corresponding to the target image.

Figure 3:
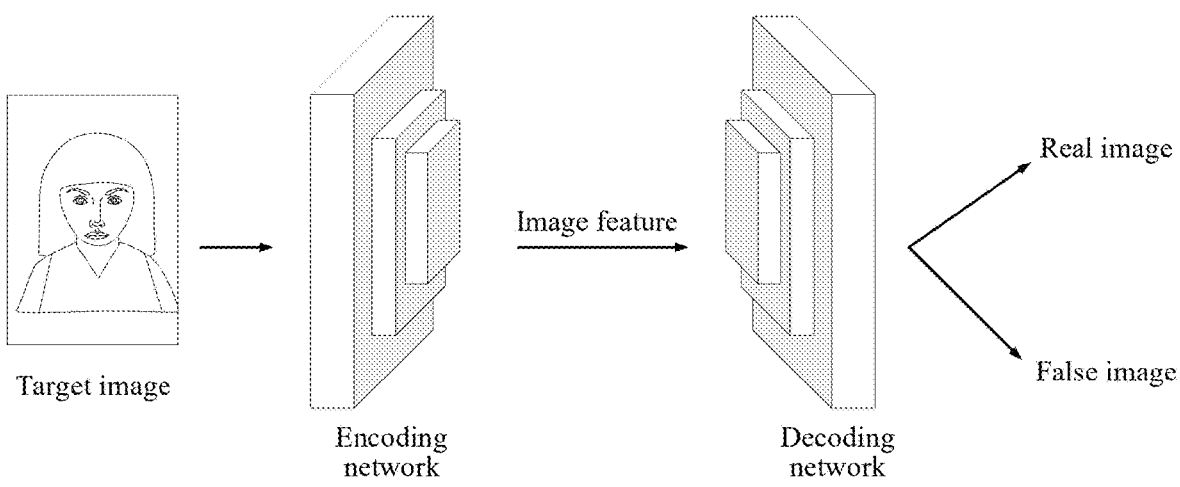
FIG. 3 is a schematic diagram of a network structure of a generator according to an embodiment.

Referring to FIG. 3, as shown in FIG. 3, the generator may be any encoder-decoder network structure. The encoding network in the generator is used for extracting the image features in the target image, and the decoding network is used for parsing the artifact image corresponding to the target image according to the image features and determine the authenticity detection result of the target image according to the artifact image. When the target image is a real image, it indicates that image content of the target image is not replaced or edited; and when the target image is a false image, it indicates that the image content of the target image is replaced or edited. FIG. 3 is a schematic diagram of a network structure of a generator according to an embodiment.

Step S206: Determine an authenticity detection result of the target image based on the artifact image.

The authenticity detection is a machine-learned model-oriented image processing task. In the field of image detection applications, such as identity authentication, face payment, or security, a machine-learned model is generally used to recognize a more reliable difference feature, and the authenticity detection result of the target image is further determined according to the difference feature.

Specifically, the computer device determines the artifact information in the artifact image, and detects the authenticity of the target image according to the artifact information. For example, the computer device determines a region size of the false region in the target image according to the artifact information in the artifact image, and determines the target image as a false image when the region size of the false region is greater than or equal to a preset region threshold; and determines the target image as a real image when the region size of the false region is less than the preset region threshold. In another example, the computer device determines whether there is an editing trace in the target image according to the artifact information in the artifact image, and determines the target image as a false image when there is an editing trace; and determines the target image as a real image when there is no editing trace. The foregoing is not limited in this embodiment.

In an embodiment, the determining an authenticity detection result of the target image based on the artifact image includes: determining a pixel value of each pixel included in the artifact image; determining an average pixel value corresponding to the artifact image based on the pixel value of each pixel; determining the target image as a false image when the average pixel value is greater than or equal to a pixel threshold; and determining the target image as a real image when the average pixel value is less than the pixel threshold.

Specifically, the computer device counts a total quantity of pixels included in the artifact image, determines the pixel value of each pixel, and accumulates the pixel value of each pixel to obtain a total pixel value. Further, the computer device may divide the total pixel value by the total quantity of pixels, to obtain the average pixel value corresponding to the artifact image, and determine the target image as a false image when the average pixel value is greater than or equal to a preset pixel threshold; and determine the target image as a real image when the average pixel value is less than the preset pixel threshold. For example, in the foregoing examples, when the artifact image outputted by the generator is consistent with the initial artifact image, namely, when the outputted artifact image is an all-black image, the calculated average pixel value is zero and less than the preset pixel threshold, so that the computer device determines the target image whose artifact image is an all-black image as a real image; and when the artifact image outputted by the generator is not an all-black image, the average pixel value is not zero in this case and is greater than the preset pixel threshold, so that the computer device determines the target image whose artifact image is not an all-black image as a false image. The preset pixel threshold may be customized as required. For example, the pixel threshold may be determined according to the accuracy of the artifact image, or the pixel threshold may be determined according to a precision requirement of image authenticity detection, which is not limited in the embodiments of this application.

In an embodiment, the pixel value of each pixel may be a value represented by using three primary colors: red (R), green (G), and blue (B), or may be a value determined based on another color dimension, which is not limited in the embodiments of this application.

In an embodiment, the computer device may perform detection on the pixel value in the artifact image based on a preset pixel value detection algorithm, to determine the pixel value of each pixel. The pixel value detection algorithm may be customized as required. For example, the pixel value of each pixel in the artifact image may be read based on an imread function in matlab, or the pixel value of each pixel in the artifact image may be read based on an at function in OpenCV.

According to the foregoing image authenticity detection method, when a target image is obtained, by inputting the target image into a generator of an adversarial network, a real and reasonable artifact image used for representing a difference between the target image and a real image may be outputted through the generator. In this way, an authenticity detection result of the target image may be determined based on artifact information in the artifact image. Because the generator may learn the most essential difference feature between a real image and a false image through adversarial training with the discriminator, compared with the authenticity detection performed on an image by detecting some specific defects in the image, this application is independent of specific defects, and the difference feature between the target image and a real image can still be determined when the target image does not have specific defects, to determine the authenticity detection result of the target image. Therefore, the generalization of image detection is greatly improved.

In addition, the generator is obtained through adversarial training with the discriminator, and the discriminator may be configured to discriminate the authenticity of the fitting image generated by the prediction artifact image outputted by the generator, the trained generator may learn the essential difference feature between a false image and a real image to generate real and reasonable artifact information, to further perform accurate determination on the target image.

In an embodiment, the target image includes a target facial image, and the method also includes: obtaining a target video including a face; parsing the target video to obtain a corresponding video frame; and performing face detection on the video frame, and cropping a facial image including a face region from the video frame based on a result of the face detection, to obtain the target facial image.

Specifically, the foregoing image authenticity detection method specifically may be used for performing authenticity detection on a facial image. When authenticity detection needs to be performed on a facial image, the computer device may obtain a target video including a face, and parse the target video to obtain a corresponding video frame. The target video specifically may be a surveillance video acquired based on a surveillance device or a media video downloaded from the Internet, which is not limited in this embodiment.

Figure 4:
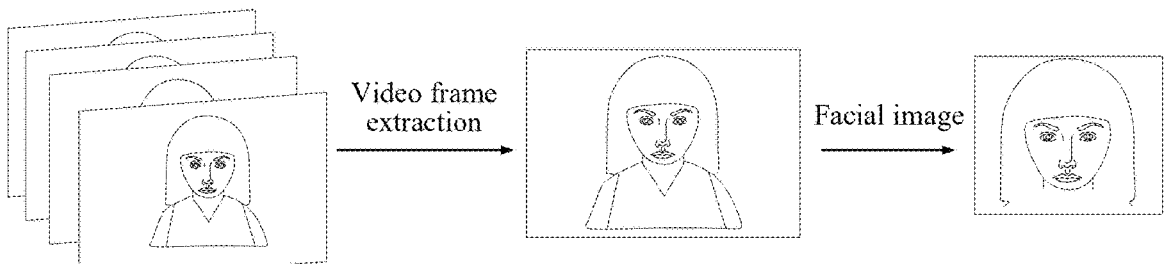
FIG. 4 is a schematic diagram of facial image extraction according to an embodiment.

The computer device performs face detection on the video frame based on a face detection algorithm, to obtain a facial image. The facial image refers to a local image of a region where the face is located in the video frame. Referring to FIG. 4, as shown in FIG. 4, the region where the face is located is a position of the face in the video frame. The computer device may recognize the face region in the video frame through the face detection algorithm. The face detection algorithm may be customized as required. For example, the face detection algorithm may be an OpenCV face detection algorithm, a face detection algorithm carried by a system, or a dual shot face detection algorithm. The face detection algorithm may return that whether a face is included in the video frame and a specific face region, for example, mark a position of the face through a rectangular box. After determining the face region in the video frame, the computer device may crop the video frame along the face region to obtain a facial image. One or more facial images may be obtained by cropping a single video frame. In this embodiment, the facial image may only include an image including a face region. FIG. 4 is a schematic diagram of facial image extraction according to an embodiment.

In an embodiment, after a video is acquired, the surveillance device may detect whether there is a face in the video, and transmits the video as a target video to the computer device when there is a face, so that the computer device obtains the target video including a face.

In an embodiment, after the target video is parsed, a plurality of corresponding video frames may be obtained, and the computer device may perform authenticity detection on each video frame or only perform authenticity detection on some video frames according to the foregoing image authenticity detection method. This is not limited in this embodiment. Because the authenticity of a facial image seriously affects the accuracy of security detection, by determining the facial image in the target video and performing authenticity detection on the facial image, the probability that a security system mistakenly determines a false facial image as a real facial image and mistakenly recognizes an unauthorized corresponding to the false facial image as an authorized user may be reduced, thereby greatly improving the security of the security system.

In the foregoing embodiment, when the target video is obtained, a corresponding video frame may be obtained by parsing the target video. By obtaining the corresponding video frame, the facial image including the face region may be cropped from the video frame, so that the computer device may only focus on the facial image including the face region and does not need to focus on non-face regions, thereby improving the efficiency of image authenticity detection.

In an embodiment, the foregoing image authenticity detection method further includes a step of adding mark information to a false image, and the step specifically includes: obtaining corresponding mark information when the authenticity detection result of the target image indicates that the target image is a false image; and adding the mark information to the target image, where the mark information is used for representing that the target image is a false image.

Specifically, when the target image is determined as a false image based on the artifact information in the artifact image, the computer device may obtain preset mark information used for distinguishing a false image from a real image and add the mark information to the target image. The mark information and a method for adding the mark information to the target image may be customized as required. For example, the mark information may be set as a character "false image", so that the character "false image" may be added to an image name of the target image, or the character "false image" may be added to the target image as a watermark.

In an embodiment, the computer device may count a quantity of video frames to which mark information is added in the target video, and determine whether there is a need to add distinguishing information used for distinguishing a false video and a real video to the target video according to the counted quantity of video frames. For example, when the quantity of video frames to which mark information is added is greater than or equal to a preset quantity threshold, it indicates that the target video is a false video, so that the computer device may add the distinguishing information to the target video, to cause the user to determine the authenticity of the video based on the distinguishing information in the video. In this way, the credibility of video content can be improved.

In an embodiment, when the computer device may determine the target image as a false image, a source of the false image may be further analyzed, for example, the false image is specifically edited through which image processing technology, or the false image is specifically edited through which software. Further, the computer device may obtain corresponding mark information based on source information related to the false image and add the mark information to the target image.

For example, in some multimedia platforms, users can upload edited face-changed videos at will. Wide spread of face-changed videos causes a continuous decrease in the public credibility of media. The image authenticity detection method provided in the embodiments of this application may assist the platforms to screen videos and add a significant mark, such as "made by an application A" to a detected fake video, to ensure the credibility of video content and the social public credibility. The image authenticity detection method provided in the embodiments of this application helps the police verify the authenticity of judicial evidence and prevent a suspect from fabricating evidence through related technologies of face editing. The method may be applicable to products such as face recognition, judicial verification tools, or picture and video authentication.

In the foregoing embodiments, the mark information used for distinguishing a false image from a real image may be added to the target image, to screen out and mark a false image from massive image data. In addition, the authenticity of the image can be quickly determined based on the mark information later, thereby further improving the efficiency of image authenticity detection.

In an embodiment, the image authenticity detection method further includes a step of training the generative adversarial network, and the step specifically includes: obtaining sample images and image labels corresponding to the sample images; inputting each sample image into a to-be-trained generator of the generative adversarial network, and outputting a prediction artifact image respectively corresponding to each sample image through the to-be-trained generator; generating a fitting image corresponding to each sample image according to the prediction artifact image; and performing iterative adversarial training on the generator and the discriminator in the generative adversarial network based on each sample image, the image label, and the fitting image, and stopping training until an iteration stop condition is reached.

The sample image is an image used for training the generative adversarial network, which specifically may include a real sample image and a false sample image. The real sample image is data of images on which image editing is not performed, and the false sample image is data of images on which image editing has been performed.

As described above, the existing method mainly detects some specific defects in an image to determine whether the target image is a false image. It can be easily found that the generalization of the method is poor. In some actual application scenarios such as identity identification, face payment, and security protection, due to the complexity of the on-site environment, an acquired target image generally does not include the specific defects. As a result, the specific defects are not detected during authenticity detection on the target image, leading to a distortion of a detection result of image authenticity detection.

To improve the accuracy and generalization of image authenticity detection, a generator and a discriminator are created in the embodiments of this application, and joint adversarial training is performed on the generator and the discriminator, so that the generator can learn the essential difference between a real image and a false image and is further configured to perform image authenticity detection. For example, in the face payment scenario, before payment is performed based on a facial image, the computer device may determine whether the facial image is an edited false image through a trained discriminator, and stop face payment when the facial image is determined as a false image, to improve the security of face payment. In another example, in the field of security protection, the computer device may perform image authenticity detection on video frames in a surveillance video stream in real time through the trained discriminator, and deliver an alarm prompt to a security guard in time when the surveillance video stream is determined as a false video based on an image authenticity detection result.

Specifically, when a sample image and a corresponding image label are obtained, the computer device may input the sample image into the generator in the generative adversarial network. The to-be-trained generator performs encoding and decoding operations on the sample image, to output a prediction artifact image. The generator may further generate a corresponding fitting image according to the prediction artifact image and the sample image. When the fitting image is obtained, the computer device performs iterative adversarial training on the generator and the discriminator in the generative adversarial network based on the sample image, the image label, and the fitting image, and stops training until an iteration stop condition is reached. The training stop condition may be that a preset quantity of iteration times is reached, a preset iteration time is reached, or model performance of the generator and the discriminator reaches preset performance.

In an embodiment, a developer may download a large quantity of images from a network and edit some images, to obtain real sample images and false sample images.

In an embodiment, due to the influence of batch normalization of the generative adversarial network, in a training stage, the computer device may select to input the real sample images and the false sample images into the to-be-trained generator alternately, or input the real sample images and the false sample images in pairs.

In an embodiment, the to-be-trained generator and discriminator may both be models formed by an artificial neural network. The ANN is also referred to as a neural network (NN) or a connection model. The ANN may abstract a human brain neural network in terms of information processing to establish a model and form different networks according to different connection manners. The ANN is generally directly referred to as an NN in the engineering field and the academic world. The NN model may be a convolutional neural network (CNN) model, a deep neural network (DNN) model, or a recurrent neural network (RNN) model.

A CNN includes a convolutional layer and a pooling layer. A DNN includes an input layer, a hidden layer, and an output layer, and layers are fully connected. A RNN is a neural network that models sequence data. That is, a current output of a sequence is also related to a previous output. A specific representation form is that the network records previous information and applies the information to calculation of the current output. That is, nodes between hidden layers are no longer connectionless but are connected, and an input of the hidden layer not only includes an output of the input layer but also includes an output of the hidden layer at a previous moment. The RNN model may be, for example, a long short-term memory neural network (LSTM) model or a bi-directional long short-term memory (BiLSTM) model.

In the foregoing embodiments, adversarial training is performed on the generator and the discriminator, so that the trained generator can learn the most essential difference feature between a real image and a false image, thereby meeting a detection requirement for an image not having specific defects in a real scenario.

In an embodiment, the generating a fitting image corresponding to sample image according to the prediction artifact image includes: performing pixel matching on the sample image and the corresponding prediction artifact image, and determining a first pixel and a second pixel corresponding to a same pixel position in the sample image and the prediction artifact image; subtracting a pixel value of the second pixel at the same pixel position from a pixel value of the first pixel, to obtain a fitting pixel value corresponding to the corresponding pixel position; and determining the fitting image of the sample image based on fitting pixel values corresponding to respective pixel positions.

Specifically, because sizes of the prediction artifact image and the sample image are the same, the generator may perform pixel matching on the sample image and the corresponding prediction artifact image, to determine the first pixel and the second pixel corresponding to the same pixel position in the sample image and the prediction artifact image according to a pixel matching result. For ease of description, a pixel in the sample image is referred to as a first pixel, and a pixel in the prediction artifact image is referred to as a second pixel. The generator traverses each pixel position, subtracts a pixel value of the second pixel having the same position from a pixel value of the first pixel to obtain a fitting pixel value corresponding to the corresponding pixel position, and uses the fitting pixel value respectively corresponding to each pixel position as a pixel value of each pixel in the fitting image corresponding to the sample image, to determine the fitting image of the sample image.

In an embodiment, the pixel value of the second pixel corresponding to the same pixel position may also be added to the pixel value of the first pixel, to obtain the fitting pixel value corresponding to the corresponding pixel position, and the fitting image of the sample image is determined according to the fitting pixel value respectively corresponding to each pixel position; or the pixel value of the second pixel corresponding to the same pixel position is added to or subtracted from the pixel value of the first pixel, to obtain the fitting pixel value corresponding to the corresponding pixel position, and the fitting pixel value is processed, for example, the fitting pixel value is inputted into a preset fitting image processing network, to obtain the fitting image of the sample image. This is not limited in this embodiment.

In the foregoing embodiment, the generator only needs to subtract the pixel value of the second pixel corresponding to the same pixel position from the pixel value of the first pixel, to obtain the corresponding fitting image. In this way, the generation efficiency of the fitting image is greatly improved.

In an embodiment, the performing iterative adversarial training on the generator and the discriminator in the generative adversarial network based on the sample image, the image label, and the fitting image, and stopping training until an iteration stop condition is reached includes: performing first training on a to-be-trained discriminator in the generative adversarial network based on the sample image, the image label, and the fitting image, and stopping until a first training stop condition is reached; inputting the fitting image into a discriminator obtained through the first training to discriminate the authenticity of the fitting image, and outputting an authenticity prediction result of the fitting image; performing second training on the to-be-trained generator in the generative adversarial network according to the authenticity prediction result of the fitting image, and stopping until a second training stop condition is reached; and returning to the operation of performing first training on a to-be-trained discriminator in the generative adversarial network based on the sample image, the image label, and the fitting image, and stopping training until the iteration stop condition is reached, to obtain a trained generative adversarial network.

Specifically, the computer device may train the generator and the discriminator alternately, and stop training until the iteration stop condition is reached. The computer device may add a gradient inversion layer after the generator, and the gradient inversion layer connects the generator and the discriminator in series, to form a generative adversarial network. When the generative adversarial network needs to be trained, the computer device fixes model parameters of one model of the generator and the discriminator, sets the model whose model parameters are fixed to a fixed state, sets a model whose model parameters are not fixed to a non-fixed state, and correspondingly adjusts the model parameters of the model in the non-fixed state. When the model parameters of the model in the non-fixed state are adjusted, the computer device sets the model in the fixed state to a non-fixed state, sets the model in the non-fixed state to a fixed state, and returns to the step of correspondingly adjusting the model parameters of the model in the non-fixed state until the iteration stop condition is reached. For example, when model parameters in the generator are fixed, the computer device correspondingly adjusts model parameters in the discriminator based on an output of the generator until the first training stop condition is reached. Further, the computer device turns to fix the model parameters of the discriminator reaching the first training stop condition, and correspondingly adjusts the model parameters of the generator based on an output of the discriminator until the second training stop condition is reached. The foregoing process is repeated and the iteration is stopped until the iteration stop condition is reached.

When the model parameters of the generator are fixed to perform first training on the discriminator, the computer device inputs the sample image and the fitting image into the to-be-trained discriminator as input images, and the to-be-trained discriminator discriminates the authenticity of the input images. Further, the to-be-trained discriminator determines a discriminator loss based on a discrimination result and the image label, determines a descending gradient according to a discriminator loss function, and correspondingly adjusts the model parameters according to the descending gradient until the first training stop condition is reached. The first training stop condition may be that a difference between the discrimination result and the image label reaches a preset minimum value, or the quantity of times of iteration reaches a preset quantity of times of iteration, or the discrimination performance of the discriminator reaches preset performance.

When the model parameters of the discriminator are fixed to perform second training on the generator, the computer device inputs the fitting image outputted by the generator into the discriminator obtained through the first training. The discriminator obtained through the first training discriminates the authenticity of the fitting image, outputs an authenticity prediction result of the fitting image, and inputs the authenticity prediction result into the to-be-trained generator through the gradient inversion layer. The to-be-trained generator correspondingly adjusts the model parameters according to the authenticity prediction result until the second training stop condition is reached. The second training stop condition may be that the authenticity prediction result is real, or the quantity of times of training iteration reaches a preset quantity of times of iteration, or the performance of the generator reaches preset performance.

In an embodiment, the generator and the discriminator in the generative adversarial network can be selected flexibly and independently, and an optimal configuration can be implemented by any independent model without compromising the performance of any link. In other words, the generator and the discriminator involved in this application may freely select a dedicated model skilled in a corresponding field respectively.

In this embodiment, joint training is performed on the generative adversarial network based on loss functions respectively corresponding to the generator and the discriminator, so that the generator and the discriminator in the generative adversarial network can both reach a good performance. Therefore, an artifact image extracted based on the trained generator has a good reliability.

In an embodiment, the sample image includes a real sample image and a false sample image; the image label includes a false region label and an image authenticity label; the discriminator includes a false region discriminator and a visual reality discriminator; the performing first training on a to-be-trained discriminator in the generative adversarial network based on the sample image, the image label, and the fitting image, and stopping until a first training stop condition is reached includes: inputting the real sample image and the false sample image into the false region discriminator respectively, and outputting first false region prediction results respectively corresponding to the real sample image and the false sample image through the false region discriminator; determining a first false region loss based on the first false region prediction results respectively corresponding to the real sample image and the false sample image and the false region label; inputting the real sample image and the fitting image into the visual reality discriminator as input images respectively, and outputting first visual reality prediction results corresponding to the input images; determining a first visual reality loss based on the first visual reality prediction results corresponding to the input images and the image authenticity label; constructing a discriminator loss function according to the first false region loss and the first visual reality loss; performing the first training on the false region discriminator and the visual reality discriminator through the discriminator loss function, and stopping until the first training stop condition is reached.

The image label includes a false region label and an image authenticity label. The false region label refers to a label used for identifying a false region in the sample image, for example, the false region label may be a rectangular box used for box selecting a false region. The image authenticity label refers to information used for representing the authenticity of the sample image. For example, when the sample image is a real image, the authenticity label of the sample image may be set as "1"; and when the sample image is a false image, the authenticity label of the sample image may be set as "0".

To accurately discriminate the authenticity of the fitting image outputted by the generator, a false region discriminator and a visual reality discriminator are constructed in the embodiments of this application. The false region discriminator is configured to discriminate a false region in the fitting image. In an ideal state, the fitting image outputted by the generator is not to include a false region, so that the false region discriminator determines the false region in the fitting image as empty. The visual reality discriminator is configured to discriminate the authenticity of the fitting image, that is, the visual reality discriminator is configured to discriminate whether the fitting image is a real image. In an ideal state, the fitting image outputted by the generator is to be close to a real image, so that the visual reality discriminator determines the authenticity of the fitting image as real.

Specifically, when a false sample image is obtained by editing an acquired image, the developer sets an image authenticity label for the false sample image, determines an image editing region in the false sample image, and sets a false region label based on the image editing region.

When first training needs to be performed on the discriminator, the computer device inputs the real sample image and the false sample image into the false region discriminator, determines false regions in the real sample image and the false sample image respectively through the false region discriminator, and outputs first false region prediction results respectively corresponding to the real sample image and the false sample image based on the false regions. The false region discriminator determines a difference between the first false region prediction result and the corresponding false region label, and determines the first false region loss according to the difference between the first false region prediction result and the corresponding false region label. The first false region loss specifically may be a mean square error, an absolute value error, a Log-Cosh loss, a quantile loss, an ideal quantile loss, or a cross entropy loss. The absolute value error is used as an example, when the false region discriminator is DMask the first false region prediction result is DMask(input), and the false region label is $\text{mask}_{gt}$, the first false region loss is $\text{LOSS}_{DMask}=|\text{DMask}(\text{input})-\text{mask}_{gt}|$.

Meanwhile, the computer device inputs the real sample image and the fitting image into the visual reality discriminator as input images respectively, and discriminates the authenticity of the input images based on the visual reality discriminator to obtain a first visual reality prediction result. The visual reality discriminator determines a difference between the first visual reality prediction result and the corresponding image authenticity label, and determines the first visual reality loss according to the difference between the first visual reality prediction result and the corresponding image authenticity label. That the first visual reality loss is a cross entropy loss is used as an example, when the visual reality discriminator is DVisual, the first visual reality prediction result is DVisual(x) the image authenticity label is $\text{cls}_{gt}$, and the cross entropy is BCE, the first visual reality loss is $\text{LOSS}_{DVisual}=\text{BCE}(\text{DVisual}(\text{x}),\text{cls}_{gt})$ Further, the computer device fuses the first false region loss and the first visual reality loss through a plurality of preset logical operations to obtain the discriminator loss function, performs training on the false region discriminator and the visual reality discriminator through the discriminator loss function, and stops until the first training stop condition is reached. The preset logical operations include, but not limited to, elementary arithmetic, weighted summation, or a machine learning algorithm.

Weighted summation is used as an example, in the foregoing example, it is assumed that weight factors are $r_1$ and $r_2$, the discriminator loss function is $\text{Loss}_D=r_1\text{Loss}_{Dvisual}$. The weight factor may be a value set according to experience or tests, such as 0.1.

In this embodiment, by training the false region discriminator and the visual reality discriminator, the trained false region discriminator can discriminate the false region in the fitting image outputted by the generator, to help the generator learn more accurate artifact information; the visual reality discriminator can discriminate the authenticity of the fitting image outputted by the generator, to help the generator output a more real fitting image; and the two discriminators supplement each other to improve the reliability of the generator.

In an embodiment, the false region discriminator is mainly configured to make the fitting image more real, so that the false region discriminator may also be replaced with a binary classification discriminator or a depth discriminator.

In an embodiment, generation steps of the false region label include: setting a pixel value of a first preset image to a first value, to obtain a false region label of the real sample image, where sizes of the first preset image and the real sample image are the same; determining a false region in the false sample image; setting a pixel value of a target region in a second preset image corresponding to the false region to a second value, and setting pixel values of other regions other than the target region in the second preset image to the first value, to obtain a false region label of the false sample image, where sizes of the second preset image and the false sample image are the same, and the second value is different from the first value.

Figure 5:
FIG. 5 is a schematic diagram of a false region label according to an embodiment.

Specifically, when the current sample image is a real sample image, the computer device obtains a first preset image and sets a pixel value of each pixel in the first preset image to a first value. For example, referring to FIG. 5, the computer device sets the pixel value of each pixel in the first preset image to (0) used for representing black, to obtain a false region label shown in FIG. 5. When the current sample image is a false sample image, the computer device determines the false region in the false sample image, obtains a second preset image, sets a pixel value of a target region in the second preset image corresponding to the false region to a second value, and sets pixel values of other regions other than the target region in the second preset image to the first value. For example, referring to FIG. 6, the computer device sets the pixel value of the target region to (1) used for representing white, and sets pixel values of other regions other than the target region to (0) used for representing black. FIG. 5 is a schematic diagram of a false region label according to an embodiment.

Sizes of the first preset image and the second preset image are the same as that of the sample image; the second value is different from the first value; and the first preset image and the second preset image may be the same or may be different.

In an embodiment, when the false sample image is a facial image including a face, the computer device detects a face contour in the false sample image according to a preset face detection algorithm, determines a false region according to the face contour, and generates a corresponding false region label according to the false region.

In the foregoing embodiment, through binarization of the false region label, not only the false region can be positioned accurately based on the binarized false region label, but also the complexity of discriminator regression training can be simplified, thereby improving the efficiency of training of the generative adversarial network.

In an embodiment, the authenticity prediction result includes a second false region prediction result and a second visual reality prediction result; and the inputting the fitting image into a discriminator obtained through the first training to discriminate the authenticity of the fitting image, and outputting an authenticity prediction result of the fitting image includes: inputting the fitting image into a false region discriminator obtained through the first training, and outputting a second false region prediction result corresponding to the fitting image; and inputting the fitting image into a visual reality discriminator obtained through the first training, and outputting a second visual reality prediction result corresponding to the fitting image.

Specifically, when the model parameters of the discriminator are fixed to perform training on the generator, the computer device inputs the sample image into the generator. The generator outputs a fitting image corresponding to the sample image, and inputs the fitting image into the false region discriminator and the visual reality discriminator obtained through the first training. The false region discriminator and the visual reality discriminator discriminate the fitting image according to the foregoing method, and correspondingly output a second false region prediction result and a second visual reality prediction result according to discrimination results.

In this embodiment, the fitting image may be discriminated based on the false region discriminator and the visual reality discriminator, so that the model parameters of the generator may be correspondingly adjusted according to the discrimination results later, to obtain a reliable generator.

In an embodiment, the performing second training on the to-be-trained generator in the generative adversarial network according to the authenticity prediction result of the fitting image, and stopping until a second training stop condition is reached includes: determining a second false region loss based on the second false region prediction result corresponding to the fitting image and a false region label corresponding to a real sample image; determining a second visual reality loss based on the second visual reality prediction result corresponding to the fitting image and an image authenticity label corresponding to the real sample image; constructing a generator loss function according to the second false region loss and the second visual reality loss; and performing training on the to-be-trained generator in the generative adversarial network through the generator loss function, and stopping until the second training stop condition is reached.

Specifically, the generator determines a difference between the second false region prediction result and the corresponding real sample image, and determines the second false region loss according to the difference between the second false region prediction result and the corresponding real sample image. That the second false region loss is an absolute value error is used as an example, when the false region discriminator is DMask, the second false region prediction result is DMask(live) and the false region label corresponding to the real sample image is zeromap, the second false region loss is $\mathrm{Loss}_{GMask}=|(\mathrm{DMask(live)}-\mathrm{zeromap}|$. zeromap may be an all-black image having the same size with the real sample image.

Meanwhile, the generator determines a difference between the second visual reality prediction result and the image authenticity label corresponding to the real sample image, and determines the second visual reality loss according to the difference between the second visual reality prediction result and the image authenticity label corresponding to the real sample image. That the second visual reality loss is a cross entropy loss is used as an example, when the visual reality discriminator is DVisual, the second visual reality prediction result is DVisual(live), the image authenticity label corresponding to the real sample image is 1, and the cross entropy is BCE, the second visual reality loss is $\mathrm{Loss}_{GVisual}=\mathrm{BCE(DVisual(live),1)}$.

Further, the computer device fuses the second false region loss and the second visual reality loss through a plurality of preset logical operations to obtain the generator loss function, performs training on the generator through the generator loss function, and stops until the second training stop condition is reached.

Weighted summation is used as an example, in the foregoing example, it is assumed that weight factors are $r_3$ and $r_4$, the corresponding generator loss function is $$\mathrm{LOSS}_G = r_3 \mathrm{Loss}_{Dmask} + r_4 \mathrm{LOSS}_{Gvisual}.$$

In this embodiment, because the generator may be constrained by the second false region loss and the second visual reality loss, a fitting image outputted by the generator on which joint training is performed through the second false region loss and the second visual reality loss can be infinitely close to a real image, and the false region included in the fitting image may be empty.

In an embodiment, the image authenticity detection method further includes: determining a prediction artifact image corresponding to the real sample image; and determining an artifact loss based on a difference between the prediction artifact image corresponding to the real sample image and the false region label corresponding to the real sample image; and the constructing a generator loss function according to the second false region loss and the second visual reality loss includes: constructing the generator loss function according to the artifact loss, the second false region loss, and the second visual reality loss.

Specifically, because in an ideal state, when the inputted sample image is a real sample image, the prediction artifact image outputted by the generator is to be consistent with the false region label corresponding to the real sample image. Therefore, an artifact loss may be added to the real sample image, and training is performed on the generator based on the artifact loss, so that the prediction artifact image corresponding to the real sample image and outputted by the trained generator can be consistent with the false region label corresponding to the real sample image.

When the real sample image is inputted into the generator and a prediction artifact image is outputted based on the generator, the computer device determines a difference between the prediction artifact image corresponding to the real sample image and the false region label corresponding to the real sample image and determines a corresponding artifact loss according to the difference. That the artifact loss is an absolute value loss is used as an example, when the prediction artifact image corresponding to the real sample image is $\text{artifact}_A$, and the false region label corresponding to the real sample image is zeromap, the artifact loss is $$\text{LOSS}_{Gartifact} = |(\text{artifact}_A - \text{zeromap})|.$$

Further, the computer device fuses the artifact loss, the second false region loss, and the second visual reality loss through a plurality of preset logical operations to obtain the generator loss function, performs training on the generator through the generator loss function, and stops until the second training stop condition is reached. Weighted summation is used as an example, in the foregoing example, it is assumed that weight factors are $r_5$, $r_6$, and $r_7$, the generator loss function is $$\text{LOSS}_G = r_5\text{LOSS}_{Gartifact} + r_6\text{LOSS}_{Gmask} + r_7\text{LOSS}_{Gvisual}.$$

Figure 6:
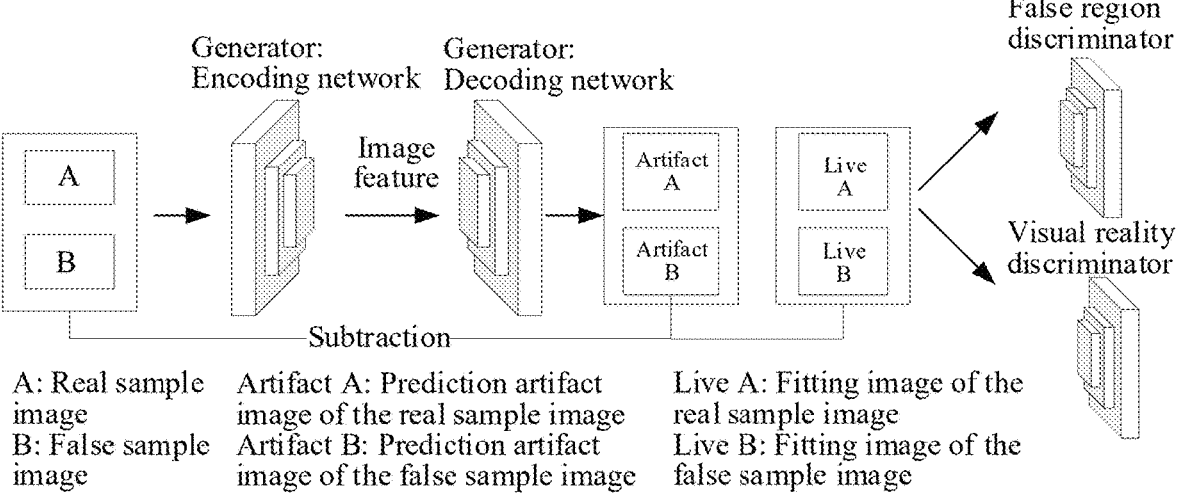
FIG. 6 is a schematic diagram of performing adversarial training based on a generator, a false region discriminator, and a visual reality discriminator according to an embodiment.

In an embodiment, Referring to FIG. 6, FIG. 6 is a schematic diagram of performing adversarial training based on a generator, a false region discriminator, and a visual reality discriminator according to an embodiment. As shown in FIG. 6, when second training is performed on the generator, a real sample image and a false sample image may be inputted into the generator as sample images. An encoding network in the generator extracts image features in the sample images, and a decoding network in the generator decodes the extracted image features, to obtain a prediction artifact image corresponding to the real sample image and a prediction artifact image corresponding to the false sample image. Further, the generator subtracts the corresponding prediction artifact image from the real sample image and subtracts the corresponding prediction artifact image from the false sample image, to obtain fitting images respectively corresponding to the real sample image and the false sample image; inputs each fitting image into the false region discriminator and the visual reality discriminator to discriminate the authenticity of the inputted fitting image through the false region discriminator and the visual reality discriminator, to obtain a second false region prediction result and a second visual reality prediction result; and returns the second false region prediction result and the second visual reality prediction result to the generator, to cause the generator to correspondingly adjust model parameters according to the returned second false region prediction result and the returned second visual reality prediction result.

When training is performed on the false region discriminator and the visual reality discriminator, the computer device inputs the sample image into the false region discriminator. The false region discriminator outputs the first false region prediction result corresponding to the sample image and inputs the real sample image and the fitting image into the visual reality discriminator as input images. The visual reality discriminator outputs the corresponding first visual reality prediction result. The computer device determines the first false region loss based on the first false region prediction result corresponding to the sample image and the false region label, determines the first visual reality loss based on the first visual reality prediction result corresponding to the input image and the image authenticity label, and constructs the discriminator loss function according to the first false region prediction result and the first visual reality prediction result; and performs the first training on the false region discriminator and the visual reality discriminator through the discriminator loss function, and stops until the first training stop condition is reached. The computer device performs the first training and the second training alternately until the iteration stop condition is reached.

In the foregoing embodiment, by setting constraints for the prediction artifact image of the real sample image, the trained generator can accurately distinguish real images from false images, thereby improving the accuracy of image authenticity detection.

In one embodiment, as shown in FIG. 7, the image authenticity detection method provided in this application includes the following steps:

S702: Obtain a target video including a face, and parse the target video to obtain a corresponding video frame.

S704: Perform face detection on the video frame, and crop a facial image including a face region from the video frame based on a result of the face detection, to obtain a target image.

S706: Input the target image into a generator of a generative adversarial network, and output an artifact image corresponding to the target image through the generator, where the artifact image is used for representing a difference between the target image and a real image; the generative adversarial network further includes a discriminator in a training stage; and in the training stage, the discriminator is configured to discriminate the authenticity of a fitting image generated based on a prediction artifact image outputted by the generator, to assist the generator to learn a difference feature between a false image and a real image.

S708: Determine a pixel value of each pixel included in the artifact image, and determine an average pixel value corresponding to the artifact image based on the pixel value of each pixel.

S710: Determine the target image as a false image when the average pixel value is greater than or equal to a pixel threshold; determine the target image as a real image when the average pixel value is less than the pixel threshold; obtain corresponding mark information when an authenticity detection result of the target image indicates that the target image is a false image; and add the mark information to the target image, where the mark information is used for representing that the target image is a false image.

According to the foregoing image authenticity detection method, when a target image is obtained, by inputting the target image into a generator of an adversarial network, a real and reasonable artifact image used for representing a difference between the target image and a real image may be outputted through the generator. In this way, an authenticity detection result of the target image may be determined based on artifact information in the artifact image. Because the generator may learn the most essential difference feature between a real image and a false image through adversarial training with the discriminator, compared with the authenticity detection performed on an image by detecting some specific defects in the image, this application is independent of specific defects, and the difference feature between the target image and a real image can still be determined when the target image does not have specific defects, to determine the authenticity detection result of the target image. Therefore, the generalization of image detection is greatly improved.

In addition, the generator is obtained through adversarial training with the discriminator, and the discriminator may be configured to discriminate the authenticity of the fitting image generated by the prediction artifact image outputted by the generator, the trained generator may learn the essential difference feature between a false image and a real image to generate real and reasonable artifact information, to further perform accurate determination on the target image.

In another embodiment, as shown in FIG. 8, the image authenticity detection method provided in this application includes the following steps:

S802: Obtain sample images and image labels corresponding to the sample images, where the image label includes a false region label and an image authenticity label.

S804: Input each sample image into a to-be-trained generator of the generative adversarial network, and output a prediction artifact image respectively corresponding to each sample image through the to-be-trained generator.

S806: Perform pixel matching on the sample image and the corresponding prediction artifact image, and determine a first pixel and a second pixel corresponding to a same pixel position in the sample image and the prediction artifact image.

S808: Subtract a pixel value of the second pixel at the same pixel position from a pixel value of the first pixel, to obtain a fitting pixel value corresponding to the corresponding pixel position; and determine the fitting image of the sample image based on fitting pixel values corresponding to respective pixel positions.

S810: Input each sample image into the false region discriminator respectively, and output a first false region prediction result corresponding to the sample image through the false region discriminator; and determine a first false region loss based on the first false region prediction result corresponding to each sample image and the false region label.

S812: The sample image includes a real sample image, input the real sample image and the fitting image into the visual reality discriminator as input images respectively, and output first visual reality prediction results corresponding to the input images; and determine a first visual reality loss based on the first visual reality prediction results corresponding to the input images and the image authenticity label.

S814: Construct a discriminator loss function according to the first false region loss and the first visual reality loss; and perform training on the false region discriminator and the visual reality discriminator through the discriminator loss function, and stop until the first training stop condition is reached.

S816: Input the fitting image into a false region discriminator obtained through the first training, and output a second false region prediction result corresponding to the fitting image; and input the fitting image into a visual reality discriminator obtained through the first training, and output a second visual reality prediction result corresponding to the fitting image.

S818: Determine a second false region loss based on the second false region prediction result corresponding to the fitting image and a false region label corresponding to a real sample image; and determine a second visual reality loss based on the second visual reality prediction result corresponding to the fitting image and an image authenticity label corresponding to the real sample image.

S820: Determine a prediction artifact image corresponding to the real sample image; and determine an artifact loss based on a difference between the prediction artifact image corresponding to the real sample image and the false region label corresponding to the real sample image.

S822: Construct a generator loss function according to the artifact loss, the second false region loss, and the second visual reality loss; and perform training on the to-be-trained generator in the generative adversarial network through the generator loss function, and stop until the second training stop condition is reached.

S824: Return to the operation of performing first training on a to-be-trained discriminator in the generative adversarial network based on the sample image, the image label, and the fitting image, and stop training until the iteration stop condition is reached, to obtain a trained generative adversarial network.

S826. Obtain a target image.

S828: Input the target image into a generator of a generative adversarial network, and output an artifact image corresponding to the target image through the generator, where the artifact image is used for representing a difference between the target image and a real image; the generative adversarial network further includes a discriminator in a training stage; and in the training stage, the discriminator is configured to discriminate the authenticity of a fitting image generated based on a prediction artifact image outputted by the generator, to assist the generator to learn a difference feature between a false image and a real image.

S830: Determine an authenticity detection result of the target image based on the artifact image.

In another embodiment, as shown in FIG. 9, the image authenticity detection method provided in this application includes the following steps:

S902: Set a pixel value of a first preset image to a first value, to obtain a false region label of the real sample image, where sizes of the first preset image and the real sample image are the same.

S904: Determine a false region in the false sample image.

S906: Set a pixel value of a target region in a second preset image corresponding to the false region to a second value, and set pixel values of other regions other than the target region in the second preset image to the first value, to obtain a false region label of the false sample image, where sizes of the second preset image and the false sample image are the same, and the second value is different from the first value.

S908: Obtain sample images and false region labels and image authenticity labels corresponding to the sample images.

S910: Input each sample image into a to-be-trained generator of the generative adversarial network, and output a prediction artifact image respectively corresponding to each sample image through the to-be-trained generator.

S912: Generate a fitting image corresponding to each sample image according to the prediction artifact image; and perform iterative adversarial training on the generator and the discriminator in the generative adversarial network based on each sample image, the image label, and the fitting image, and stop training until an iteration stop condition is reached.

S914. Obtain a target image.

S916: Input the target image into a generator of a generative adversarial network, and output an artifact image corresponding to the target image through the generator, where the artifact image is used for representing a difference between the target image and a real image; the generative adversarial network further includes a discriminator in a training stage; and in the training stage, the discriminator is configured to discriminate the authenticity of a fitting image generated based on a prediction artifact image outputted by the generator, to assist the generator to learn a difference feature between a false image and a real image.

S918: Determine an authenticity detection result of the target image based on the artifact image.

This application further provides an image authenticity detection method. A description is made by using an example in which the method is applicable to a computer device, and the computer device specifically may be the terminal or the server in FIG. 1. As shown in FIG. 10, the image authenticity detection method includes the following steps:

S1002: Obtain sample images and image labels corresponding to the sample images, where the sample image includes a real sample image and a false sample image; and the image label includes a false region label and an image authenticity label.

Specifically, when training needs to be performed on a generative adversarial network, sample images and image labels corresponding to the sample images may be inputted into the computer device. The sample image includes a real sample image and a false sample image; and the image label includes a false region label and an image authenticity label.

S1004: Input each real sample image and each false sample image into a to-be-trained generator in a generative adversarial network respectively, output a prediction artifact image respectively corresponding to each real sample image and each false sample image through the to-be-trained generator, and generate a fitting image respectively corresponding to each real sample image and each false sample image according to the prediction artifact image.

S1006: Input each real sample image, each false sample image, and the fitting image into a to-be-trained discriminator in the generative adversarial network respectively, and output a first false region prediction result and a first visual reality prediction result.

S1008: Perform first training on the to-be-trained discriminator based on a first difference between the first false region prediction result and a corresponding false region label and a second difference between the first visual reality prediction result and a corresponding image authenticity label, and stop until a first training stop condition is reached.

Specifically, the computer device inputs each sample image into the to-be-trained generator of the generative adversarial network. The to-be-trained generator outputs a prediction artifact image corresponding to each sample image and subtracts the corresponding prediction artifact image from each sample image to obtain the fitting image corresponding to each sample image. The computer device inputs each sample image and the fitting image into the to-be-trained discriminator of the generative adversarial network, and the to-be-trained discriminator outputs a first false region prediction result and a first visual reality prediction result. The computer device determines a first difference between the first false region prediction result and the corresponding false region label and a second difference between the first visual reality prediction result and the corresponding image authenticity label, constructs a discriminator loss function according to the first difference and the second difference, performs first training on the to-be-trained discriminator based on the discriminator loss function, and stops until a first training stop condition is reached.

The discriminator includes a false region discriminator and a visual reality discriminator; the first difference specifically may be represented by the first false region loss mentioned in the foregoing embodiments, and the second difference specifically may be represented by the first visual reality loss mentioned in the foregoing embodiments; and determining methods of the first difference and the second difference may be calculated respectively according to the calculation methods of the first false region loss and the first visual reality loss. For specific content of the first training performed by the computer device, reference may be made to related description in the foregoing embodiments.

Each sample image and the fitting image are inputted into the to-be-trained discriminator in the generative adversarial network respectively, and the first false region prediction result and the first visual reality prediction result are outputted; and the performing first training on the to-be-trained discriminator based on a first difference between the first false region prediction result and a corresponding false region label and a second difference between the first visual reality prediction result and a corresponding image authenticity label, and stopping until a first training stop condition is reached includes: inputting each sample image into the false region discriminator respectively, and outputting the first false region prediction result corresponding to each sample image through the false region discriminator; determining a first false region loss based on the first false region prediction result corresponding to each sample image and the false region label; inputting the real sample image and the fitting image into the visual reality discriminator as input images respectively, and outputting first visual reality prediction results corresponding to the input images; determining a first visual reality loss based on the first visual reality prediction results corresponding to the input images and the image authenticity label; constructing a discriminator loss function according to the first false region loss and the first visual reality loss; and performing the first training on the false region discriminator and the visual reality discriminator through the discriminator loss function, and stopping until the first training stop condition is reached.

S1010: Input the fitting image into a discriminator obtained through the first training, and output a second false region prediction result and a second visual reality prediction result of the fitting image.

Specifically, the computer device inputs the fitting image into the discriminator obtained through the first training, and the discriminator obtained through the first training outputs a second false region prediction result and a second visual reality prediction result of the fitting image.

The inputting the fitting image into a discriminator obtained through the first training, and outputting a second false region prediction result and a second visual reality prediction result of the fitting image includes: inputting the fitting image into a false region discriminator obtained through the first training, and outputting a second false region prediction result corresponding to the fitting image; and inputting the fitting image into a visual reality discriminator obtained through the first training, and outputting a second visual reality prediction result corresponding to the fitting image.

S1012: Perform second training on the to-be-trained generator based on a third difference between the second false region prediction result and a false region label corresponding to each real sample image and a fourth difference between the second visual reality prediction result and an image authenticity label corresponding to each real sample image, and stop until a second training stop condition is reached.

Specifically, the computer device determines a third difference between the second false region prediction result and a false region label corresponding to each real sample image and determines a fourth difference between the second visual reality prediction result and an image authenticity label corresponding to each real sample image, constructs a generator loss function according to the third difference and the fourth difference, performs second training on the generator based on the generator loss function, and stops until a second training stop condition is reached.

The third difference specifically may be represented by the second false region loss in the foregoing embodiments; the fourth difference may be represented by the second visual reality loss in the foregoing embodiments; and determining methods of the third difference and the fourth difference may be calculated respectively according to the calculation methods of the second false region loss and the second visual reality loss in the foregoing embodiments. For specific content of the second training performed by the computer device, reference may be made to related description in the foregoing embodiments.

The performing second training on the to-be-trained generator based on a third difference between the second false region prediction result and a false region label corresponding to each real sample image and a fourth difference between the second visual reality prediction result and an image authenticity label corresponding to each real sample image, and stopping until a second training stop condition is reached includes: determining a second false region loss based on the second false region prediction result corresponding to the fitting image and a false region label corresponding to each real sample image; determining a second visual reality loss based on the second visual reality prediction result corresponding to the fitting image and an image authenticity label corresponding to each real sample image; constructing a generator loss function according to the second false region loss and the second visual reality loss; and performing training on the to-be-trained generator in the generative adversarial network through the generator loss function, and stopping until the second training stop condition is reached.

S1014: Perform the first training and the second training alternately, and stop training until an iteration stop condition is reached, to obtain a trained generative adversarial network, where a generator in the trained generative adversarial network is configured to perform image authenticity detection on a target image.

Specifically, the computer device performs the first training and the second training alternately, stops training until an iteration stop condition is reached to obtain a trained generative adversarial network, inputs a target image into a generator in the trained generative adversarial network, outputs an artifact image corresponding to the target image through the trained generator, and determines an authenticity detection result of the target image based on the artifact image.

In an embodiment, a fifth difference may also be determined, and the generator loss function is constructed according to the fifth difference, the fourth difference, and the third difference. The fifth difference specifically may be represented by the foregoing artifact loss. A determining method of the fifth difference includes: determining a prediction artifact image corresponding to the real sample image; and using a difference between the prediction artifact image corresponding to the real sample image and the false region label corresponding to the real sample image as the fifth difference.

In the image authenticity detection method, adversarial training is performed on the generator and the discriminator. In a training stage, the generator is configured to learn an artifact image and synthesizes a fitting image based on the artifact image. On one hand, the discriminator learns false region information corresponding to the real sample image and the false sample image and has a capability of reconstructing the false region of the fitting image. On the other hand, the discriminator may learn a difference between the real sample image and the fitting image to have a capability of discriminating the authenticity of the fitting image. After such iterative adversarial training, the generator and the discriminator in the trained generative adversarial network can both reach a good performance. Therefore, an artifact image extracted based on the trained generator has a good reliability.

This application further provides an application scenario, and the image authenticity detection method is applicable to the application scenario. Specifically, applications of the image authenticity detection method in the application scenario are as follows:

Before a user account is frozen based on an account management application, to ensure the account security, the account management application may acquire a facial image of a current user by invoking an image acquisition device, and transmits the facial image of the current user to a server. The server performs face authentication on the facial image of the current user. When the facial image of the current user is received by the server, the server inputs the facial image of the current user into a generator in a generative adversarial network, determines an artifact image corresponding to the target image through the generator, and discriminates the authenticity of the facial image of the current user based on artifact information in the artifact image. Therefore, when the facial image of the current user is a false image, the account management application refuses to freeze the user account; and when the facial image of the current user is a real image, the account management application freezes the user account.

It is to be understood that, although the steps in the flowcharts of FIG. 2, FIG. 7, FIG. 8, FIG. 9, and FIG. 10 are sequentially displayed according to indication of arrows, the steps are not necessarily sequentially performed in the sequence indicated by the arrows. Unless otherwise explicitly specified in this specification, execution of the steps is not strictly limited, and the steps may be performed in other sequences. Moreover, at least some of the steps in FIG. 2, FIG. 7, FIG. 8, FIG. 9, and FIG. 10 may include a plurality of sub-steps or a plurality of stages. These sub-steps or stages are not necessarily performed at the same moment, but may be performed at different moments. These sub-steps or stages are not necessarily performed sequentially, but may be performed in turn or alternately with at least some of other steps or sub-steps or stages of the other steps.

Figure 11:
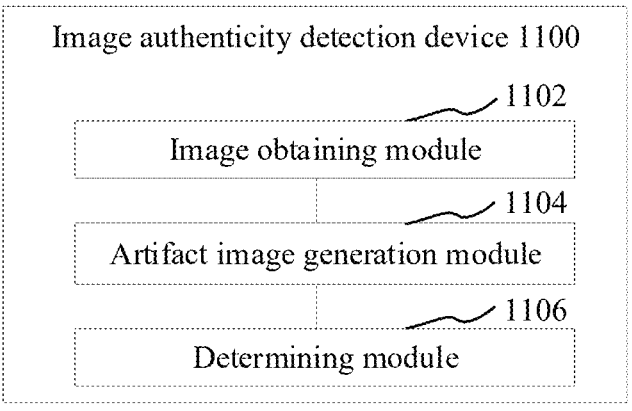
FIG. 11 is a structural block diagram of an image authenticity detection device according to an embodiment.

In an embodiment, as shown in FIG. 11, an image authenticity detection device 1100 is provided. The device may use a software module or a hardware module, or a combination thereof forms a part of a computer device. The device specifically includes: an image obtaining module 1102, an artifact image generation module 1104, and a determining module 1106.

The image obtaining module 1102 is configured to obtain a target image.

The artifact image generation module 1104 is configured to input the target image into a generator of a generative adversarial network, and output an artifact image corresponding to the target image through the generator, where the artifact image is used for representing a difference between the target image and a real image; the generative adversarial network further includes a discriminator in a training stage; in the training stage, the generator is configured to output a prediction artifact image corresponding to a sample image and generate a fitting image based on the prediction artifact image; and the discriminator is configured to discriminate the authenticity of the fitting image, to assist the generator to learn a difference feature between a false image and a real image.

The determining module 1106 is configured to determine an authenticity detection result of the target image based on the artifact image.

Figure 12:
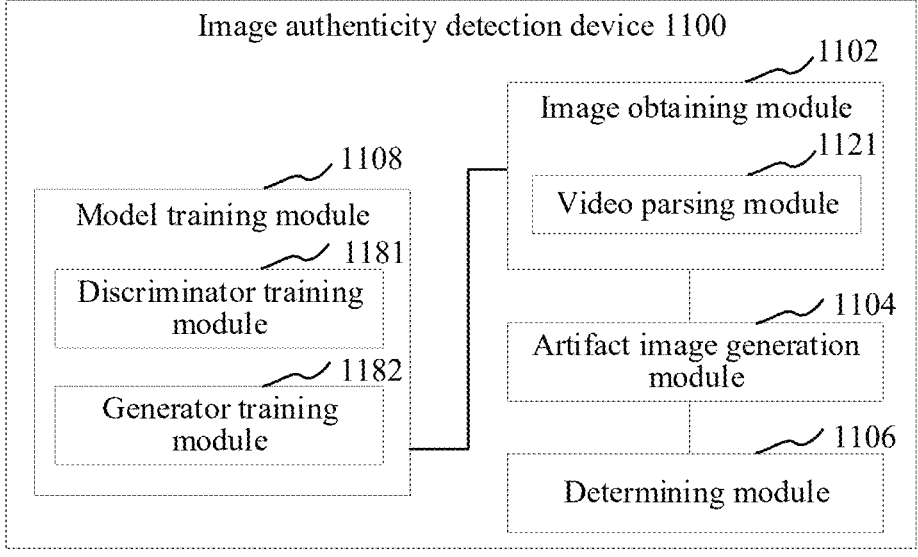
FIG. 12 is a structural block diagram of an image authenticity detection device according to another embodiment.

In an embodiment, as shown in FIG. 12, the image obtaining module 1102 further includes a video parsing module 1121 configured to: obtain a target video including a face; parse the target video to obtain a corresponding video frame; and perform face detection on the video frame, and crop a facial image including a face region from the video frame based on a result of the face detection.

In an embodiment, the determining module 1106 is further configured to: determine a pixel value of each pixel included in the artifact image; determine an average pixel value corresponding to the artifact image based on the pixel value of each pixel; determine the target image as a false image when the average pixel value is greater than or equal to a pixel threshold; and determine the target image as a real image when the average pixel value is less than the pixel threshold.

In an embodiment, the image authenticity detection device 1100 is further configured to obtain corresponding mark information when the authenticity detection result of the target image indicates that the target image is a false image; and add the mark information to the target image, where the mark information is used for representing that the target image is a false image.

In an embodiment, the image authenticity detection device 1100 further includes a model training module 1108 configured to: obtain sample images and image labels corresponding to the sample images; input each sample image into a to-be-trained generator of the generative adversarial network, and output a prediction artifact image respectively corresponding to each sample image through the to-be-trained generator; generate a fitting image corresponding to each sample image according to the prediction artifact image; and perform iterative adversarial training on the generator and the discriminator in the generative adversarial network based on each sample image, the image label, and the fitting image, and stop training until an iteration stop condition is reached.

In an embodiment, the model training module 1108 is further configured to: perform pixel matching on the sample image and the corresponding prediction artifact image, and determine a first pixel and a second pixel corresponding to a same pixel position in the sample image and the prediction artifact image; subtract a pixel value of the second pixel at the same pixel position from a pixel value of the first pixel, to obtain a fitting pixel value corresponding to the corresponding pixel position; and determine the fitting image of the sample image based on fitting pixel values corresponding to respective pixel positions.

In an embodiment, the model training module 1108 is further configured to: perform first training on a to-betrained discriminator in the generative adversarial network based on each sample image, the image label, and the fitting image, and stop until a first training stop condition is reached; input the fitting image into a discriminator obtained through the first training to discriminate the authenticity of the fitting image, and output an authenticity prediction result of the fitting image; perform second training on the to-be-trained generator in the generative adversarial network according to the authenticity prediction result of the fitting image, and stop until a second training stop condition is reached; and return to the operation of performing first training on a to-be-trained discriminator in the generative adversarial network based on the sample image, the image label, and the fitting image, and stop training until the iteration stop condition is reached, to obtain a trained generative adversarial network.

In an embodiment, the sample image includes a real sample image and a false sample image; the image label includes a false region label and an image authenticity label; the discriminator includes a false region discriminator and a visual reality discriminator; and the model training module 1108 further includes a discriminator training module 1181 configured to: input the real sample image and the false sample image into the false region discriminator respectively, and output first false region prediction results respectively corresponding to the real sample image and the false sample image through the false region discriminator; determine a first false region loss based on the first false region prediction results respectively corresponding to the real sample image and the false sample image and the false region label; input the real sample image and the fitting image into the visual reality discriminator as input images respectively, and output first visual reality prediction results corresponding to the input images through the visual reality discriminator; determine a first visual reality loss based on the first visual reality prediction results corresponding to the input images and the image authenticity label; construct a discriminator loss function according to the first false region loss and the first visual reality loss; and perform the first training on the false region discriminator and the visual reality discriminator through the discriminator loss function, and stop until the first training stop condition is reached.

In an embodiment, the discriminator training module 1181 is further configured to: set a pixel value of a first preset image to a first value, to obtain a false region label of the real sample image, where sizes of the first preset image and the real sample image are the same; determine a false region in the false sample image; and set a pixel value of a target region in a second preset image corresponding to the false region to a second value, and set pixel values of other regions other than the target region in the second preset image to the first value, to obtain a false region label of the false sample image, where sizes of the second preset image and the false sample image are the same, and the second value is different from the first value.

In an embodiment, the authenticity prediction result includes a second false region prediction result and a second visual reality prediction result; and the model training module 1108 further includes a generator training module 1182 configured to: input the fitting image into a false region discriminator obtained through the first training, and output a second false region prediction result corresponding to the fitting image; and input the fitting image into a visual reality discriminator obtained through the first training, and output a second visual reality prediction result corresponding to the fitting image.

In an embodiment, the generator training module 1182 is further configured to determine a second false region loss based on the second false region prediction result corresponding to the fitting image and a false region label corresponding to a real sample image; and determine a second visual reality loss based on the second visual reality prediction result corresponding to the fitting image and an image authenticity label corresponding to the real sample image; construct a generator loss function according to the second false region loss and the second visual reality loss; and perform training on the to-be-trained generator in the generative adversarial network through the generator loss function, and stop until the second training stop condition is reached.

In an embodiment, the generator training module 1182 is further configured to determine a prediction artifact image corresponding to the real sample image; and determine an artifact loss based on a difference between the prediction artifact image corresponding to the real sample image and the false region label corresponding to the real sample image; and the constructing a generator loss function according to the second false region loss and the second visual reality loss includes: constructing the generator loss function according to the artifact loss, the second false region loss, and the second visual reality loss.

Figure 13:
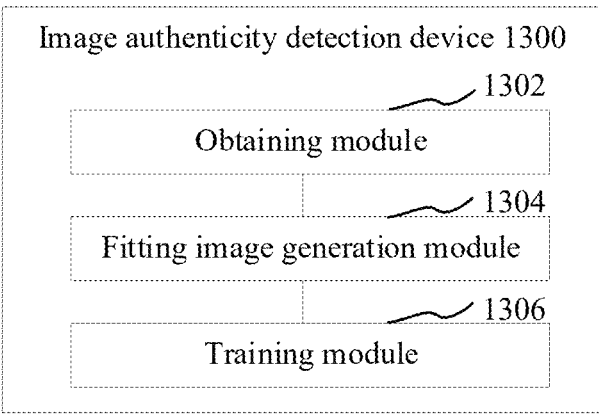
FIG. 13 is a structural block diagram of an image authenticity detection device according to still another embodiment.

As shown in FIG. 13, an image authenticity detection device 1300 is provided. The device may use a software module or a hardware module, or a combination thereof forms a part of a computer device. The device specifically includes: an obtaining module 1302, a fitting image generation module 1304, and a training module 1306.

The obtaining module 1302 is configured to obtain sample images and image labels corresponding to the sample images, where the sample image includes a real sample image and a false sample image; and the image label includes a false region label and an image authenticity label.

The fitting image generation module 1304 is configured to input each real sample image and each false sample image into a to-be-trained generator in a generative adversarial network respectively, output a prediction artifact image respectively corresponding to each real sample image and each false sample image through the to-be-trained generator, and generate a fitting image respectively corresponding to each real sample image and each false sample image according to the prediction artifact image.

The training module 1306 is configured to input each real sample image, each false sample image, and the fitting image into a to-be-trained discriminator in the generative adversarial network respectively, and output a first false region prediction result and a first visual reality prediction result.

The training module 1306 is further configured to perform first training on the to-be-trained discriminator based on a first difference between the first false region prediction result and a corresponding false region label and a second difference between the first visual reality prediction result and a corresponding image authenticity label, and stop until a first training stop condition is reached.

The training module 1306 is configured to input the fitting image into a discriminator obtained through the first training, and output a second false region prediction result and a second visual reality prediction result of the fitting image.

The training module 1306 is further configured to perform second training on the to-be-trained generator based on a third difference between the second false region prediction result and a false region label corresponding to each real sample image and a fourth difference between the second visual reality prediction result and an image authenticity label corresponding to each real sample image, and stop until a second training stop condition is reached.

The training module 1306 is further configured to perform the first training and the second training alternately, and stop training until an iteration stop condition is reached, to obtain a trained generative adversarial network, where a generator in the trained generative adversarial network is configured to perform image authenticity detection on a target image.

For a specific limitation on the image authenticity detection device, reference may be made to the limitation on the image authenticity detection method above. Details are not described herein again. All or some of the modules in the image authenticity detection device may be implemented through software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 14. The computer device includes a processor, a memory, and a model interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store image authenticity detection data. The model interface of the computer device is configured to communicate with an external terminal through a model. The computer program is executed by the processor to implement an image authenticity detection method.

Figure 14:
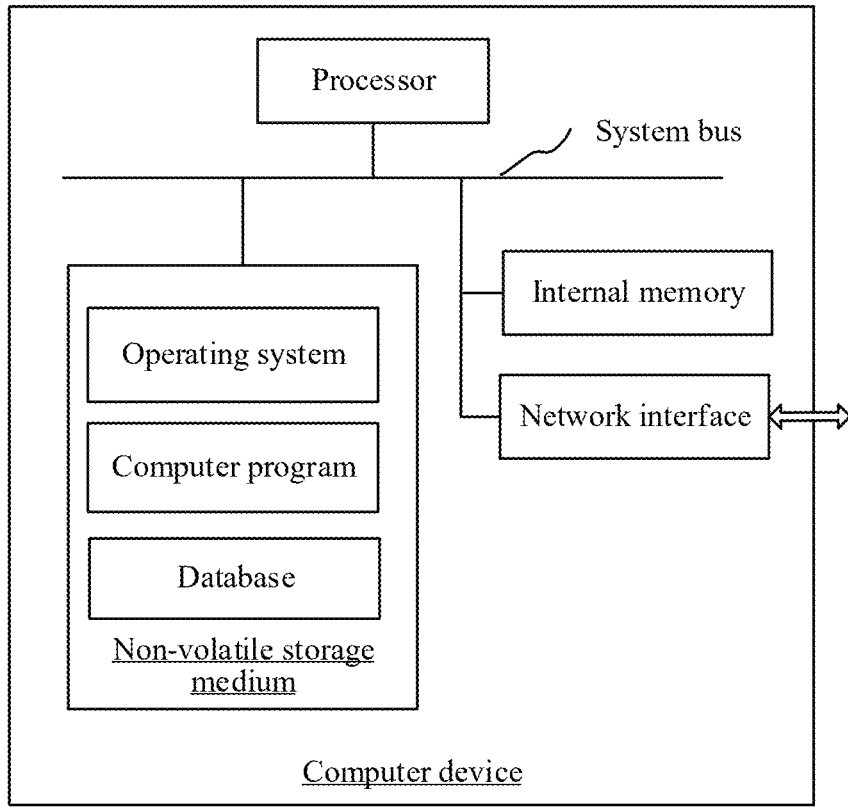
FIG. 14 is a diagram of an internal structure of a computer device according to an embodiment.

A person skilled in the art may understand that the structure shown in FIG. 14 is only a block diagram of a partial structure related to the solution of this application, and does not limit the computer device to which the solution of this application is applicable. Specifically, the computer device may include more or fewer components than those shown in the figure, or some components are combined, or a different component deployment is used.

In an embodiment, a computer device is provided, including a memory and one or more processors, the memory storing computer-readable instructions, and the computer-readable instructions, when executed by the one or more processors, causing the one or more processors to perform the steps in the foregoing method embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the foregoing method embodiments.

In an embodiment, one or more non-volatile storage media storing computer-readable instructions are provided, the computer-readable instructions, when executed by one or more processors, causing the one or more processors to perform the steps in the foregoing method embodiments.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

What is claimed is:

1. An image authenticity detection method, performed by a computer device, the method comprising:

obtaining a target image;

inputting the target image into a generator of a generative adversarial network, and outputting an artifact image corresponding to the target image through the generator, wherein the artifact image represents a difference between the target image and a real image; the generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false sample image and a real sample image; and determining an authenticity detection result of the target image based on the artifact image, wherein the generative adversarial network is obtained by:

obtaining sample images and image labels corresponding to the sample images;

inputting each sample image into a to-be-trained generator of the generative adversarial network, and outputting a prediction artifact image respectively corresponding to each sample image through the to-be-trained generator;

generating the fitting image corresponding to each sample image according to the prediction artifact image, comprising:

performing pixel matching on the sample image and the corresponding prediction artifact image, and determining a first pixel and a second pixel corresponding to a same pixel position in the sample image and the prediction artifact image;

subtracting a pixel value of the second pixel at the same pixel position from a pixel value of the first pixel, to obtain a fitting pixel value corresponding to the corresponding pixel position; and determining the fitting image of the sample image based on fitting pixel values corresponding to respective pixel positions; and performing iterative adversarial training on the generator and the discriminator in the generative adversarial network based on each sample image, the image label, and the fitting image, and stopping training when an iteration stop condition is reached.

2. The method according to claim 1, wherein the target image comprises a target facial image, and the method further comprises:

obtaining a target video comprising a face;

parsing the target video to obtain a corresponding video frame; and performing face detection on the video frame, and cropping a facial image comprising a face region from the video frame based on a result of the face detection, to obtain the target facial image.

3. The method according to claim 1, wherein the method further comprises:

obtaining corresponding mark information when the authenticity detection result of the target image indicates that the target image is the false image; and adding the mark information to the target image, wherein the mark information represents that the target image is the false image.

4. The method according to claim 1, wherein the performing iterative adversarial training on the generator and the discriminator in the generative adversarial network based on each sample image, the image label, and the fitting image, and stopping training when the iteration stop condition is reached comprises:

performing first training on the discriminator in the generative adversarial network based on each sample image, the image label, and the fitting image, and stopping when a first training stop condition is reached; inputting the fitting image into a discriminator obtained through the first training to discriminate the authenticity of the fitting image, and outputting an authenticity prediction result of the fitting image;

performing second training on the generator in the generative adversarial network according to the authenticity prediction result of the fitting image, and stopping when a second training stop condition is reached; and returning to the operation of performing first training on the discriminator in the generative adversarial network based on each sample image, the image label, and the fitting image, and stopping training when the iteration stop condition is reached, to obtain the trained generative adversarial network.

5. The method according to claim 4, wherein the sample image comprises the real sample image and the false sample image; the image label comprises a false region label and an image authenticity label; the discriminator comprises a false region discriminator and a visual reality discriminator; and the performing first training on the discriminator in the generative adversarial network based on each sample image, the image label, and the fitting image, and stopping when the first training stop condition is reached comprises:

inputting the real sample image and the false sample image into the false region discriminator respectively, and outputting first false region prediction results respectively corresponding to the real sample image and the false sample image through the false region discriminator;

determining a first false region loss based on the first false region prediction results respectively corresponding to the real sample image and the false sample image and the false region label;

inputting the real sample image and the fitting image into the visual reality discriminator as input images respectively, and outputting first visual reality prediction results corresponding to the input images;

determining a first visual reality loss based on the first visual reality prediction results corresponding to the input images and the image authenticity label;

constructing a discriminator loss function according to the first false region loss and the first visual reality loss; and performing the first training on the false region discriminator and the visual reality discriminator through the discriminator loss function, and stopping when the first training stop condition is reached.

6. The method according to claim 5, wherein generation operations of the false region label comprise:

setting a pixel value of a first preset image to a first value, to obtain a false region label of the real sample image, wherein sizes of the first preset image and the real sample image are the same;

determining a false region in the false sample image; and setting a pixel value of a target region in a second preset image corresponding to the false region to a second value, and setting pixel values of other regions other than the target region in the second preset image to the first value, to obtain a false region label of the false sample image, wherein sizes of the second preset image and the false sample image are the same, and the second value is different from the first value.

7. The method according to claim 4, wherein the authenticity prediction result comprises a second false region prediction result and a second visual reality prediction result; and the inputting the fitting image into a discriminator obtained through the first training to discriminate the authenticity of the fitting image, and outputting an authenticity prediction result of the fitting image comprises:

inputting the fitting image into a false region discriminator obtained through the first training, and outputting a second false region prediction result corresponding to the fitting image; and inputting the fitting image into a visual reality discriminator obtained through the first training, and outputting a second visual reality prediction result corresponding to the fitting image.

8. The method according to claim 7, wherein the performing second training on the generator in the generative adversarial network according to the authenticity prediction result of the fitting image, and stopping when the second training stop condition is reached comprises:

determining a second false region loss based on the second false region prediction result corresponding to the fitting image and a false region label corresponding to the real sample image;

determining a second visual reality loss based on the second visual reality prediction result corresponding to the fitting image and an image authenticity label corresponding to the real sample image;

constructing a generator loss function according to the second false region loss and the second visual reality loss; and performing the second training on the generator in the generative adversarial network through the generator loss function, and stopping when the second training stop condition is reached.

9. The method according to claim 8, wherein the method further comprises:

determining a prediction artifact image corresponding to the real sample image; and determining an artifact loss based on a difference between the prediction artifact image corresponding to the real sample image and the false region label corresponding to the real sample image; and the constructing a generator loss function according to the second false region loss and the second visual reality loss comprises:

constructing the generator loss function according to the artifact loss, the second false region loss, and the second visual reality loss.

10. An image authenticity detection device, comprising a memory and one or more processors, the memory storing computer-readable instructions, and the computer-readable instructions, when executed by the one or more processors, causing the one or more processors to:

obtain a target image;

input the target image into a generator of a generative adversarial network, and outputting an artifact image corresponding to the target image through the generator, wherein the artifact image represents a difference between the target image and a real image; the generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false sample image and a real sample image; and determine an authenticity detection result of the target image based on the artifact image, wherein the generative adversarial network is obtained by:

obtaining sample images and image labels corresponding to the sample images;

inputting each sample image into a to-be-trained generator of the generative adversarial network, and outputting a prediction artifact image respectively corresponding to each sample image through the to-be-trained generator;

generating the fitting image corresponding to each sample image according to the prediction artifact image, comprising:

performing pixel matching on the sample image and the corresponding prediction artifact image, and determining a first pixel and a second pixel corresponding to a same pixel position in the sample image and the prediction artifact image;

subtracting a pixel value of the second pixel at the same pixel position from a pixel value of the first pixel, to obtain a fitting pixel value corresponding to the corresponding pixel position; and determining the fitting image of the sample image based on fitting pixel values corresponding to respective pixel positions; and performing iterative adversarial training on the generator and the discriminator in the generative adversarial network based on each sample image, the image label, and the fitting image, and stopping training when an iteration stop condition is reached.

11. The device according to claim 10, wherein the processor is further configured to: obtain a target video comprising a face; parse the target video to obtain a corresponding video frame; and perform face detection on the video frame, and crop a facial image comprising a face region from the video frame based on a result of the face detection.

12. The device according to claim 10, wherein the processor is further configured to obtain corresponding mark information when the authenticity detection result of the target image indicates that the target image is the false image; and add the mark information to the target image, wherein the mark information represents that the target image is the false image.

13. The device according to claim 10, wherein the performing iterative adversarial training on the generator and the discriminator in the generative adversarial network based on each sample image, the image label, and the fitting image, and stopping training when the iteration stop condition is reached comprises:

performing first training on the discriminator in the generative adversarial network based on each sample image, the image label, and the fitting image, and stopping when a first training stop condition is reached;

inputting the fitting image into a discriminator obtained through the first training to discriminate the authenticity of the fitting image, and outputting an authenticity prediction result of the fitting image;

performing second training on the generator in the generative adversarial network according to the authenticity prediction result of the fitting image, and stopping when a second training stop condition is reached; and returning to the operation of performing first training on the discriminator in the generative adversarial network based on each sample image, the image label, and the fitting image, and stopping training when the iteration stop condition is reached, to obtain the trained generative adversarial network.

14. One or more non-transitory storage media storing computer-readable instructions, the computer-readable instructions, when executed by one or more processors, causing the one or more processors to perform:

obtaining a target image;

inputting the target image into a generator of a generative adversarial network, and outputting an artifact image corresponding to the target image through the generator, wherein the artifact image represents a difference between the target image and a real image; the generator is configured to output a prediction artifact image corresponding to a sample image and generate a fitting image based on the prediction artifact image; and the generative adversarial network further comprises a discriminator in a training stage, and the discriminator is configured to discriminate the authenticity of the fitting image, to assist the generator to learn a difference feature between a false sample image and a real sample image; and determining an authenticity detection result of the target image based on the artifact image, wherein the generative adversarial network is obtained by:

obtaining sample images and image labels corresponding to the sample images;

inputting each sample image into a to-be-trained generator of the generative adversarial network, and outputting a prediction artifact image respectively corresponding to each sample image through the to-be-trained generator;

generating the fitting image corresponding to each sample image according to the prediction artifact image, comprising:

performing pixel matching on the sample image and the corresponding prediction artifact image, and determining a first pixel and a second pixel corresponding to a same pixel position in the sample image and the prediction artifact image;

subtracting a pixel value of the second pixel at the same pixel position from a pixel value of the first pixel, to obtain a fitting pixel value corresponding to the corresponding pixel position; and determining the fitting image of the sample image based on fitting pixel values corresponding to respective pixel positions; and performing iterative adversarial training on the generator and the discriminator in the generative adversarial network based on each sample image, the image label, and the fitting image, and stopping training when an iteration stop condition is reached.

15. The method according to claim 1, wherein determining the authenticity detection result of the target image based on the artifact image comprises:

determining pixel values of a plurality of pixels comprised in the artifact image;

determining an average pixel value corresponding to the artifact image based on the pixel values of the plurality of pixels;

determining the target image as a false image when the average pixel value is greater than or equal to a pixel threshold; and determining the target image as the real image when the average pixel value is less than the pixel threshold.

16. The device according to claim 10, wherein determining the authenticity detection result of the target image based on the artifact image comprises:

determining pixel values of a plurality of pixels comprised in the artifact image;

determining an average pixel value corresponding to the artifact image based on the pixel values of the plurality of pixels;

determining the target image as a false image when the average pixel value is greater than or equal to a pixel threshold; and determining the target image as the real image when the average pixel value is less than the pixel threshold.

17. The device according to claim 13, wherein the sample image comprises the real sample image and the false sample image; the image label comprises a false region label and an image authenticity label; the discriminator comprises a false region discriminator and a visual reality discriminator; and the performing first training on the discriminator in the generative adversarial network based on each sample image, the image label, and the fitting image, and stopping when the first training stop condition is reached comprises:

inputting the real sample image and the false sample image into the false region discriminator respectively, and outputting first false region prediction results respectively corresponding to the real sample image and the false sample image through the false region discriminator;

determining a first false region loss based on the first false region prediction results respectively corresponding to the real sample image and the false sample image and the false region label;

inputting the real sample image and the fitting image into the visual reality discriminator as input images respectively, and outputting first visual reality prediction results corresponding to the input images;

determining a first visual reality loss based on the first visual reality prediction results corresponding to the input images and the image authenticity label;

constructing a discriminator loss function according to the first false region loss and the first visual reality loss; and performing the first training on the false region discriminator and the visual reality discriminator through the discriminator loss function, and stopping when the first training stop condition is reached.

18. The device according to claim 17, wherein generation operations of the false region label comprise:

setting a pixel value of a first preset image to a first value, to obtain a false region label of the real sample image, wherein sizes of the first preset image and the real sample image are the same;

determining a false region in the false sample image; and setting a pixel value of a target region in a second preset image corresponding to the false region to a second value, and setting pixel values of other regions other than the target region in the second preset image to the first value, to obtain a false region label of the false sample image, wherein sizes of the second preset image and the false sample image are the same, and the second value is different from the first value.

19. The device according to claim 13, wherein the authenticity prediction result comprises a second false region prediction result and a second visual reality prediction result; and the inputting the fitting image into a discriminator obtained through the first training to discriminate the authenticity of the fitting image, and outputting an authenticity prediction result of the fitting image comprises:

inputting the fitting image into a false region discriminator obtained through the first training, and outputting a second false region prediction result corresponding to the fitting image; and inputting the fitting image into a visual reality discriminator obtained through the first training, and outputting a second visual reality prediction result corresponding to the fitting image.

20. The device according to claim 19, wherein the performing second training on the generator in the generative adversarial network according to the authenticity prediction result of the fitting image, and stopping when the second training stop condition is reached comprises:

determining a second false region loss based on the second false region prediction result corresponding to the fitting image and a false region label corresponding to the real sample image;

determining a second visual reality loss based on the second visual reality prediction result corresponding to the fitting image and an image authenticity label corresponding to the real sample image;

constructing a generator loss function according to the second false region loss and the second visual reality loss; and performing the second training on the generator in the generative adversarial network through the generator loss function, and stopping when the second training stop condition is reached.

* * * * *